C. SUTTER.
AUTOMATIC MACHINE GUN.
APPLICATION FILED MAR. 25, 1921.
1,431,057.
Patented Oct. 3, 1922.
15 SHEETS—SHEET 15.
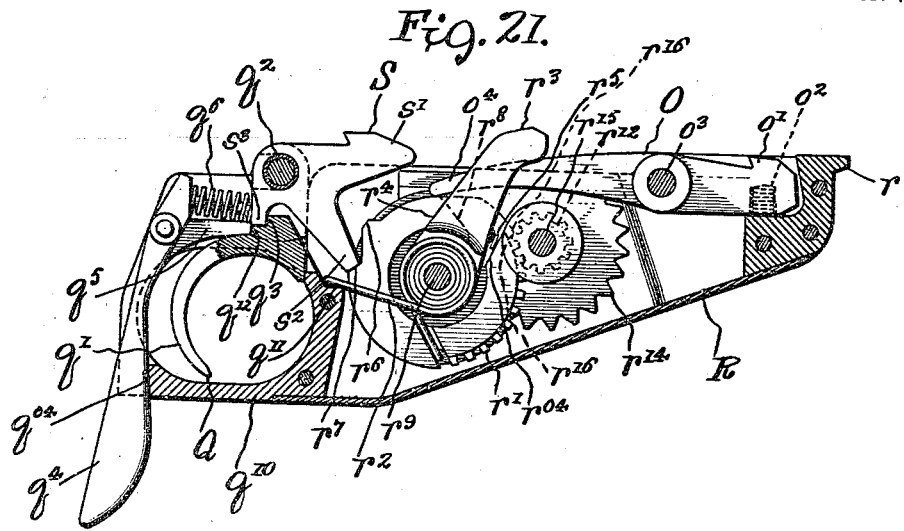
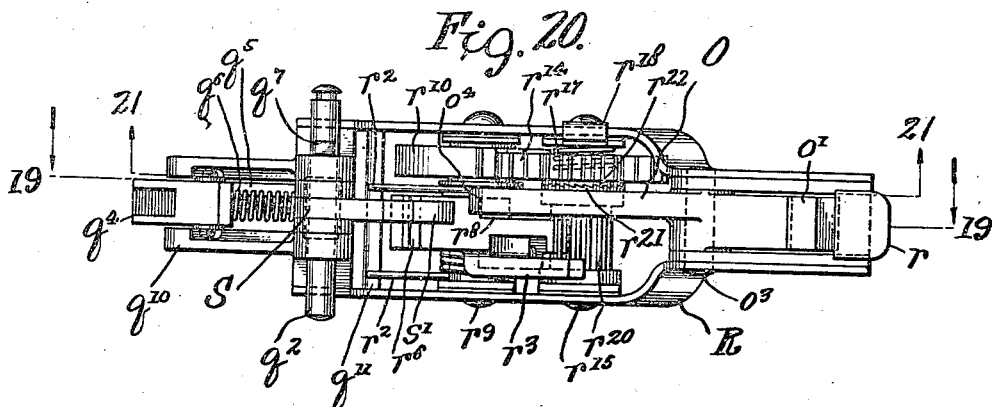
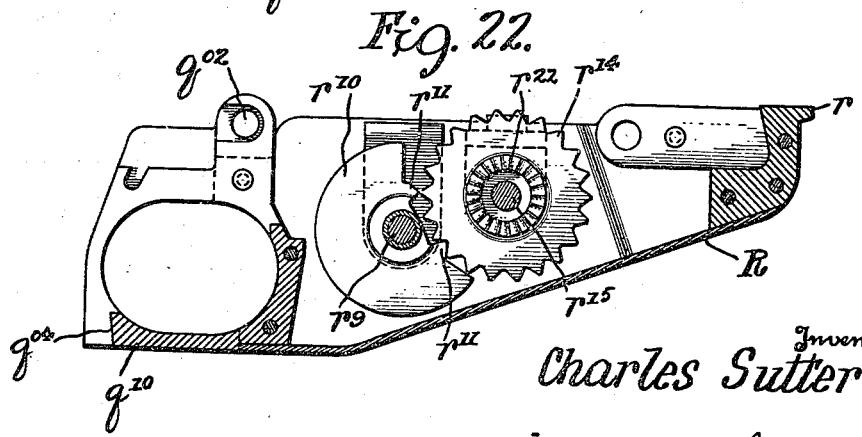
Charles Sutter, Inventor
By Wilkinson & Giusta,
Attorneys Patented Oct. 3, 1922.

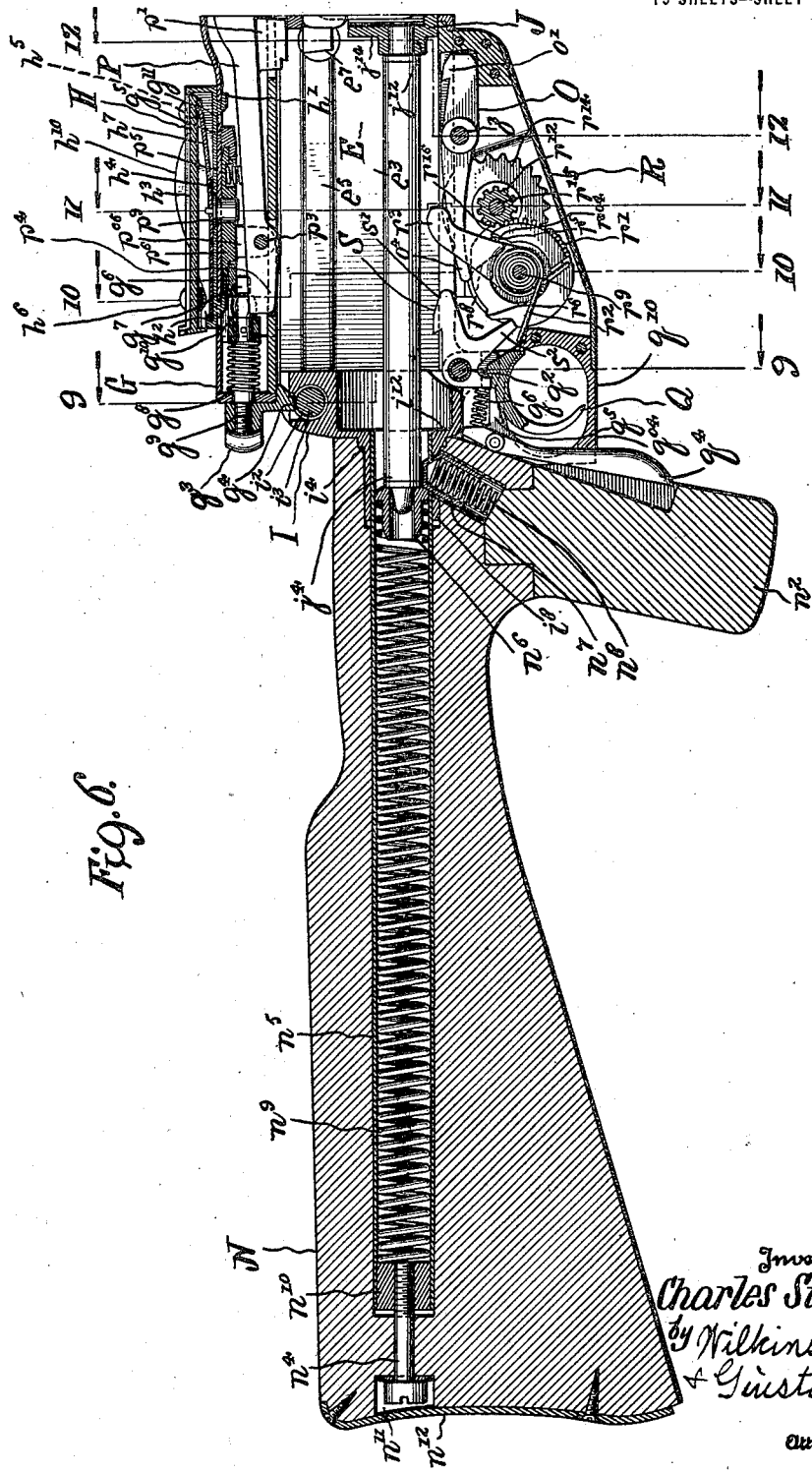

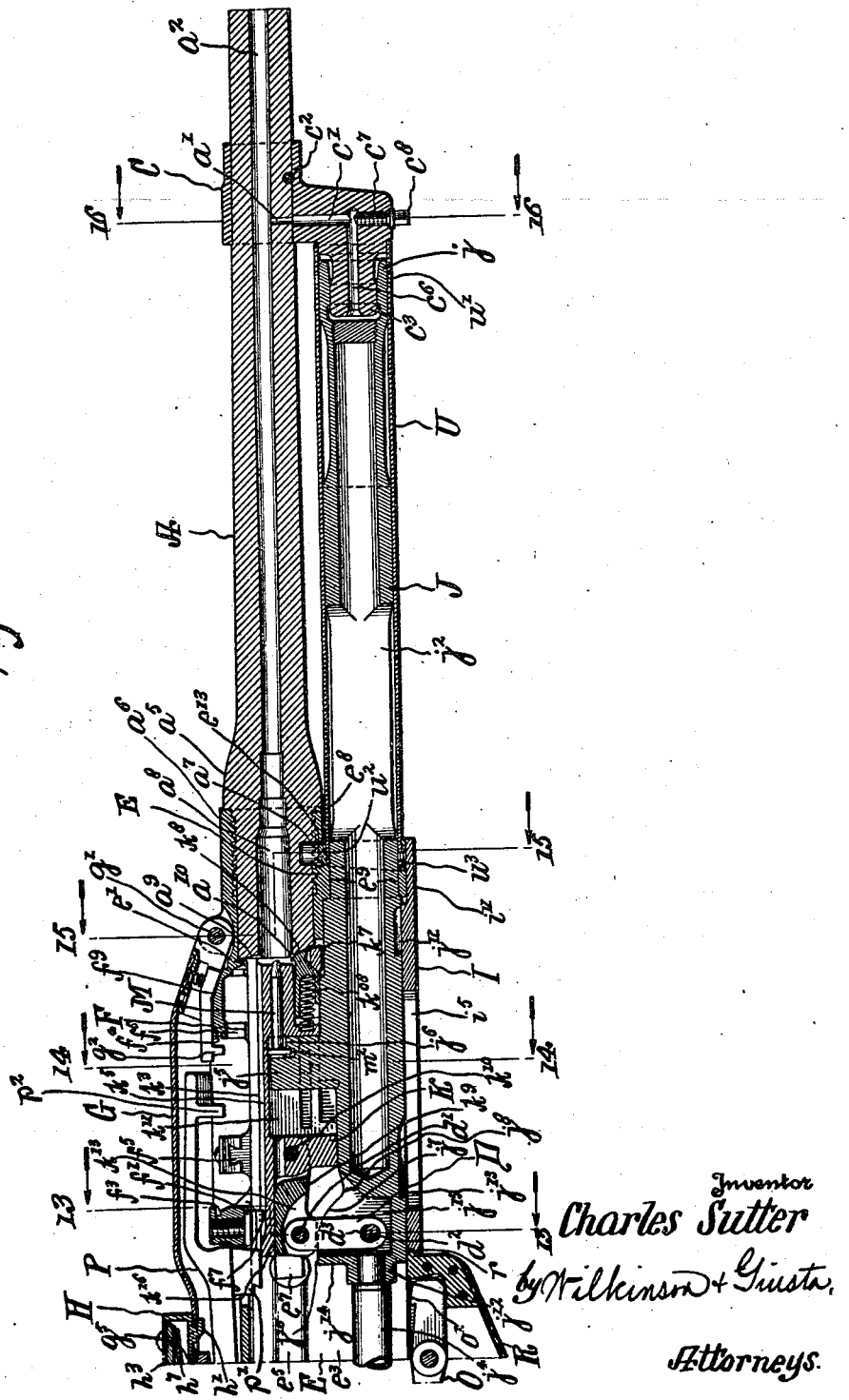

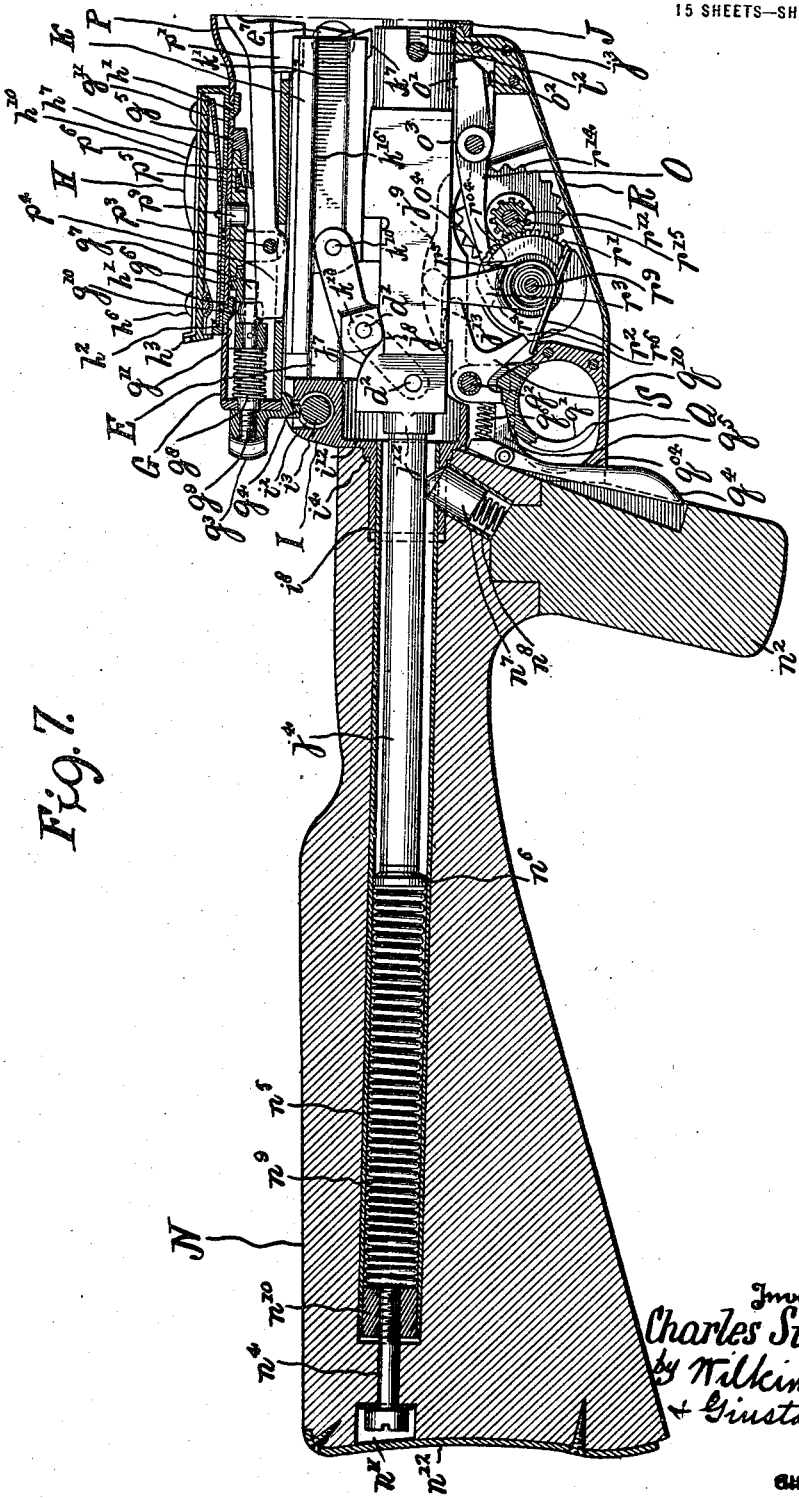

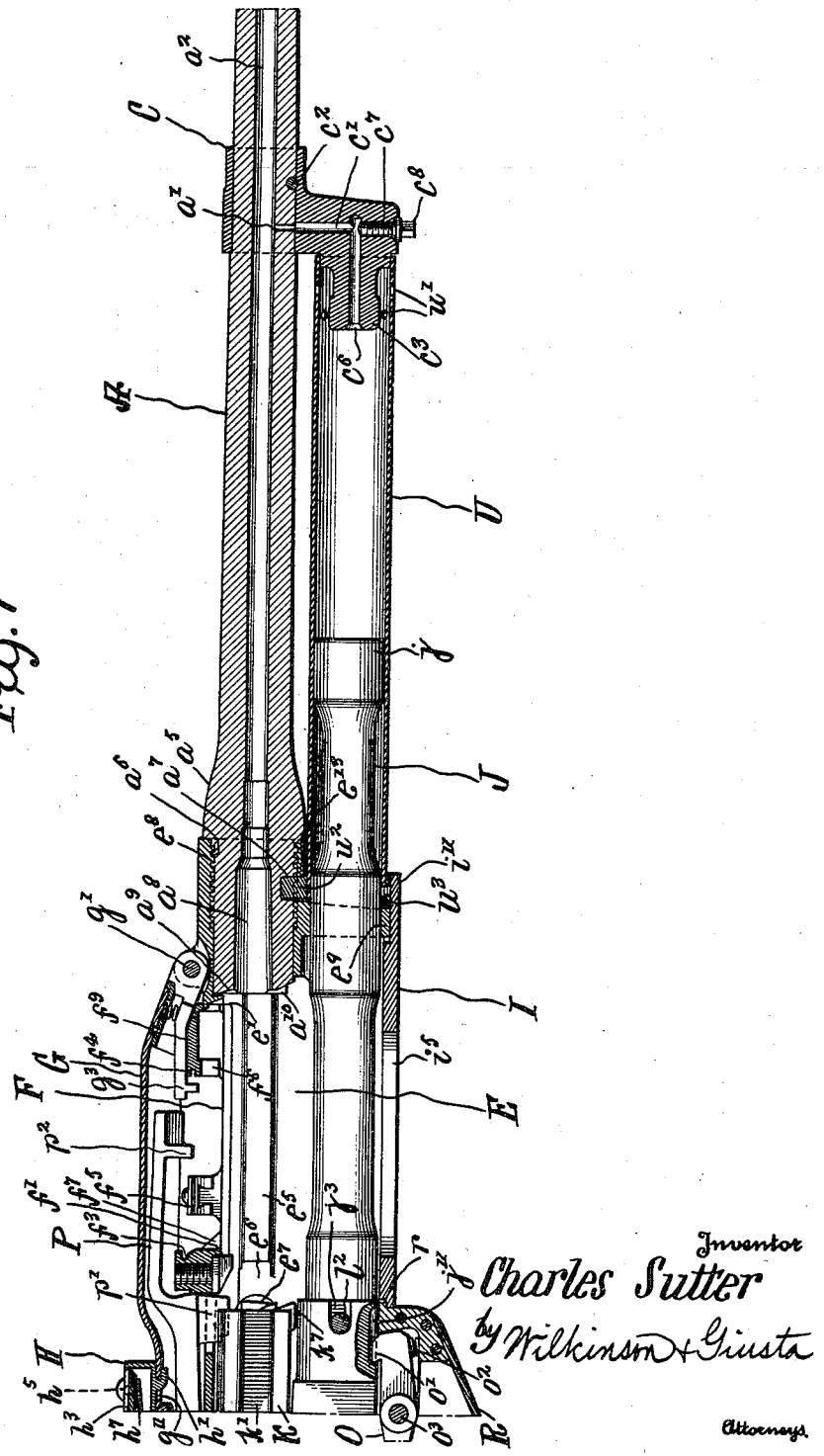

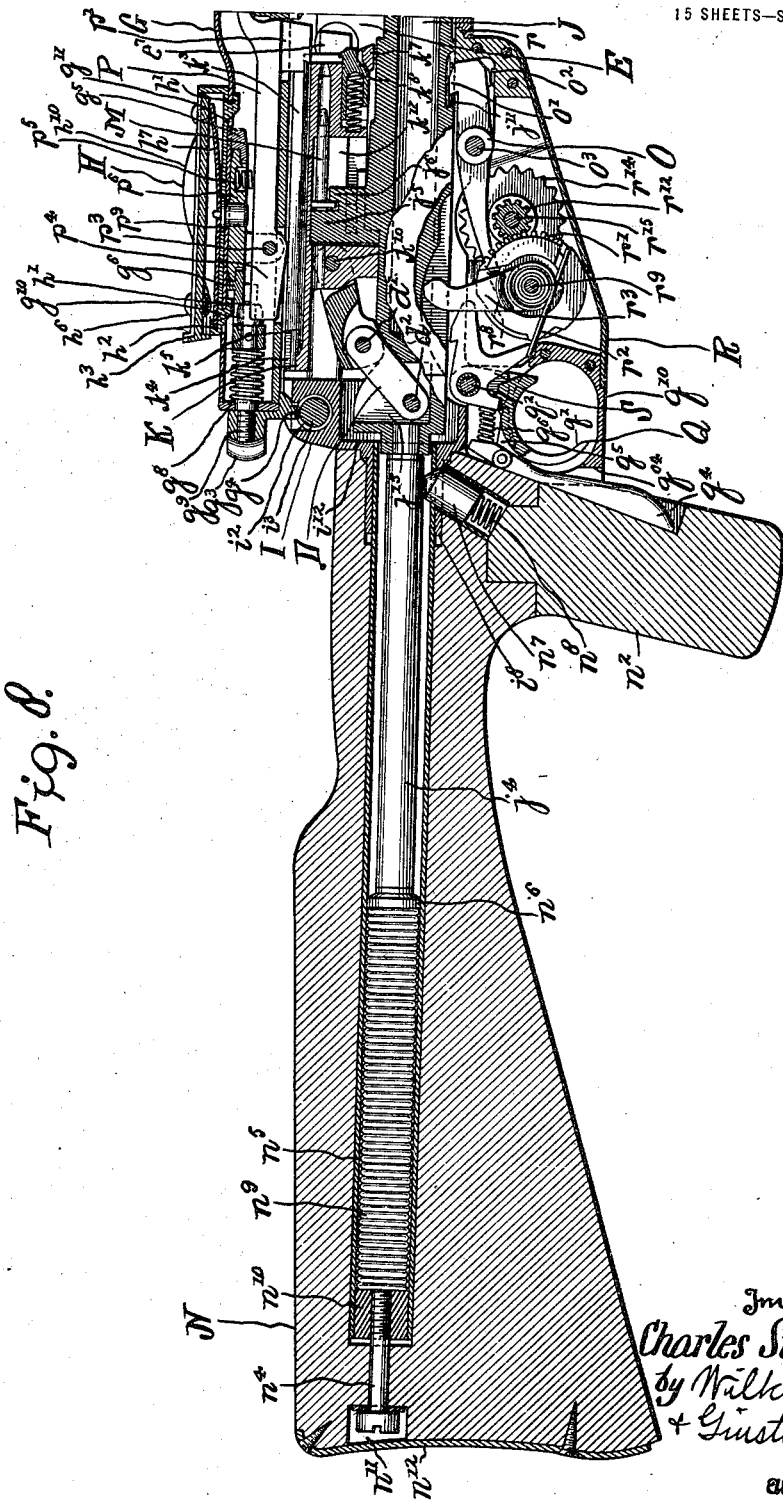

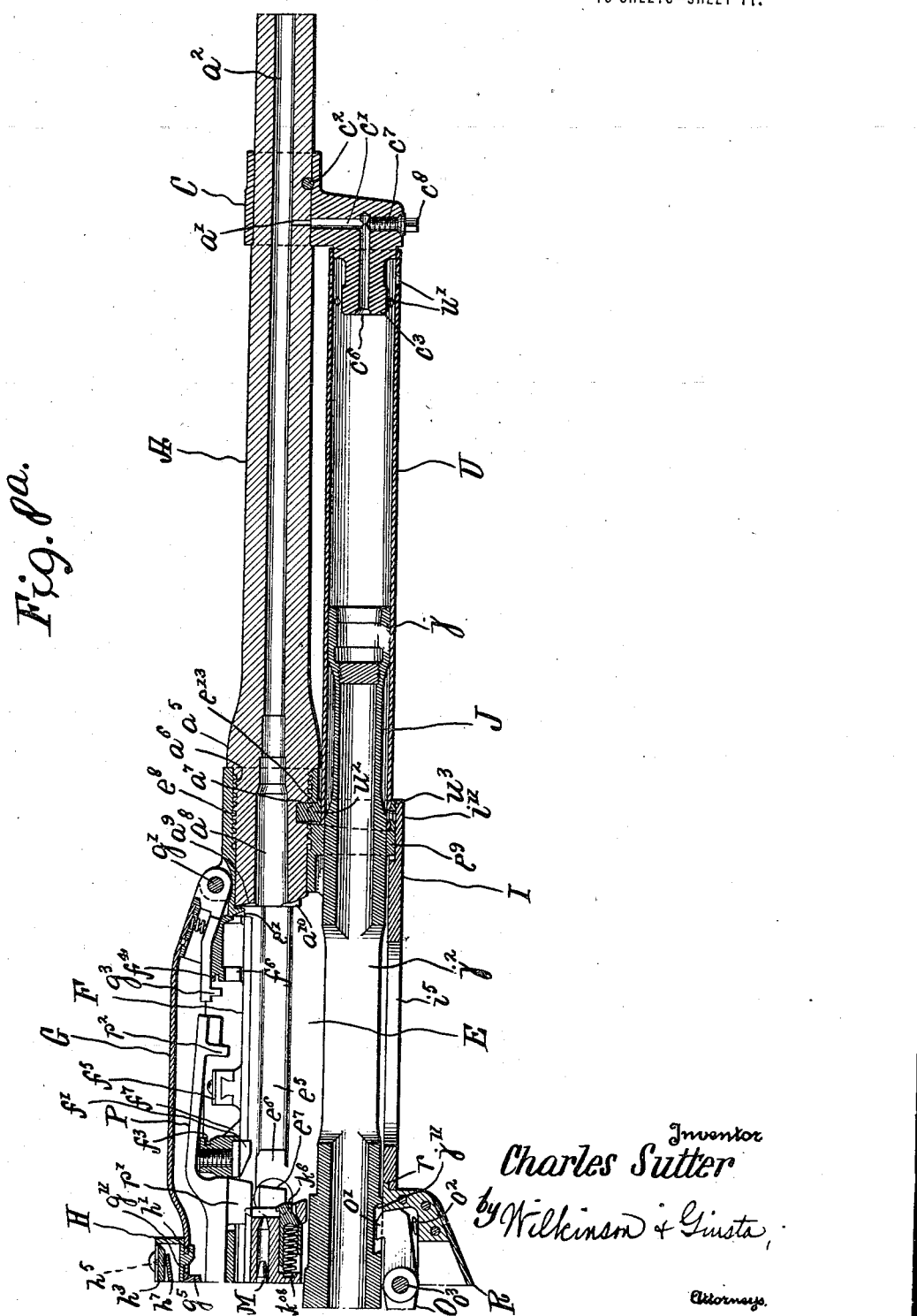

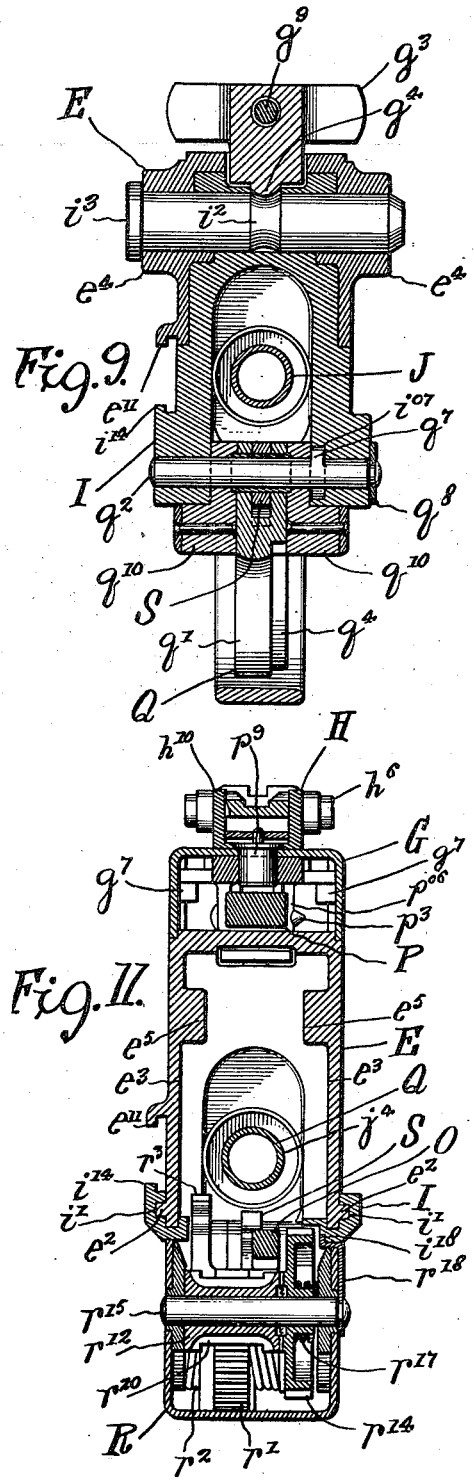
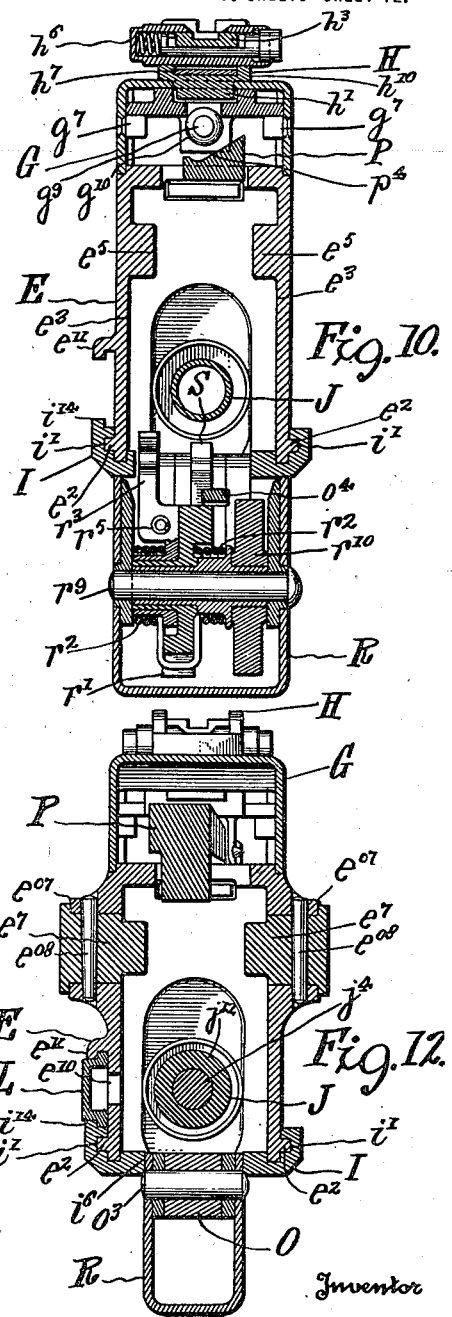

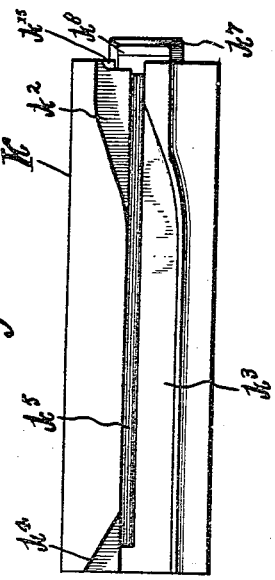

1,431,057

UNITED STATES PATENT OFFICE.

CHARLES SUTTER, OF SURESNES, FRANCE.

AUTOMATIC MACHINE GUN.

Application filed March 25, 1921. Serial No. 455,701.

*To all whom it may concern:*

Be it known that I, CHARLES SUTTER, a citizen of the French Republic, residing at Suresnes, Seine, France, have invented certain new and useful Improvements in Automatic Machine Guns; and I do hereby declare the following to be a full, clear, and exact description of the invention, such as will enable others skilled in the art to which it appertains to make and use the same.

My invention relates to that class of gas operated automatic firearms that can be either fired from the shoulder, with the soldier standing, or, using a muzzle support, it may be fired by the soldier in the recumbent position.

My invention is especially intended to provide certain novel features including the feed mechanism, the breech closing and locking device, and the firing regulator.

The invention also relates to means for closing all of the apertures to prevent the introduction of mud, water or dust to the mechanism during transport or operation, and to a muzzle support arrangement which folds up alongside of the barrel.

The invention is especially intended to reduce as far as possible the weight of the gun, to simplify the construction and operation of the parts, and to render the construction as rugged as practicable, so that the parts are less liable to get out of order.

My invention is especially intended to provide an improvement on the structure shown in the patent to L. V. Benet and H. A. Mercie, No. 1,125,937, granted January 26, 1913, and entitled Automatic shoulder rifle.

My invention will be more fully understood after reference to the accompanying drawings, in which like parts are indicated by similar reference symbols throughout the several views, and in which:—

Figures 6 and 6ª show vertical longitudinal sections through the complete piece along the axis of the barrel, with the breech block in the closed position and the motor piston in the forward position, the parts being shown on a larger scale than in the preceding figures.

Figures 7 and 7ª are similar views to Figs. 6 and 6ª, except that the breech block is shown in the open position ready for feeding a fresh cartridge case, and the motor piston is shown in the corresponding position.

Figures 8 and 8ª are similar views to Figs. 7 and 7ª, except that the breech block and the motor piston are in a slightly further rearward position than as shown in Figs. 7 and 7ª, whereby a fresh feed strip may be inserted; the position shown in Figs. 8 and 8ª being that assumed when the last cartridge of the old feed strip has been fired.

Figure 9 shows a transverse section through the piece along the broken line 9—9 of Fig. 6, and looking in the direction of the arrows.

Figure 10 shows a similar section along the line 10—10 of Fig. 6.

Figure 11 shows a similar section along the line 11—11 of Fig. 6.

Figure 12 shows a similar section along the line 12—12 of Fig. 6.

Figure 13:
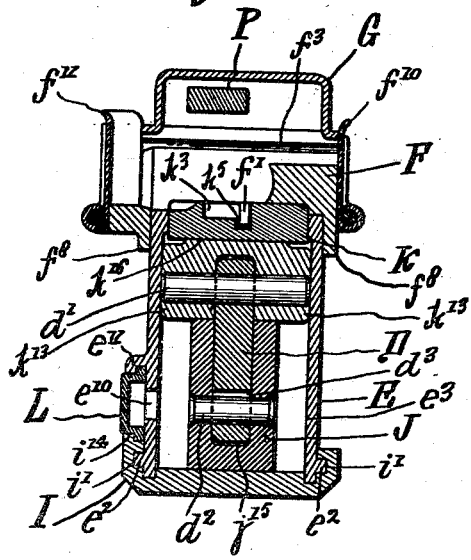

Figure 13 shows a section along the line 13—13 of Fig. 6ª.

Figure 14:
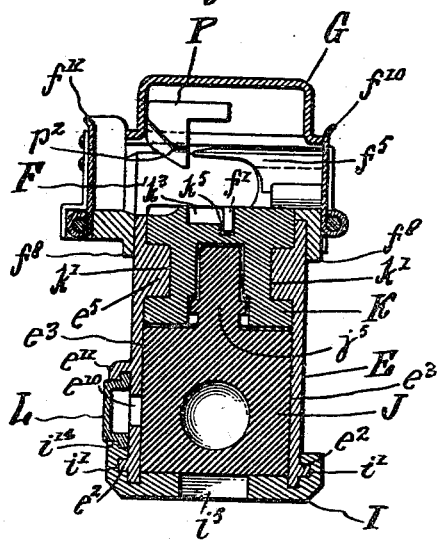

Figure 14 shows a section along the line 14—14 of Fig. 6ª.

Figure 15:
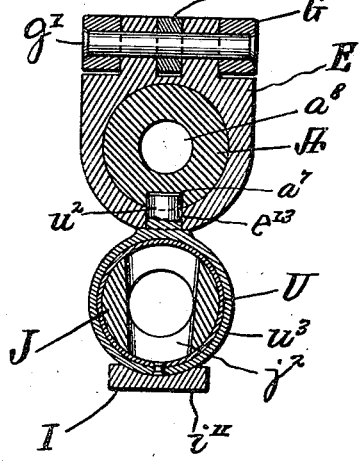

Figure 15 shows a section along the line 15—15 of Fig. 6ª.

Figure 16:
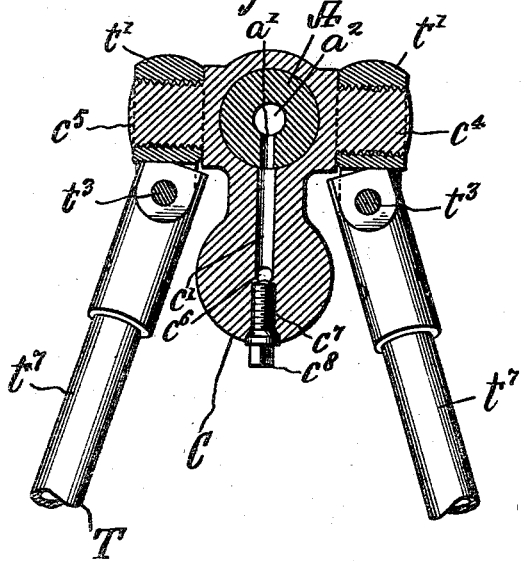

Figure 16 shows a section along the line 16—16 of Fig. 6ª.

The views shown in Figures 9 to 16 should all be seen in the direction of the arrows.

Figure 17 is a top plan view of the breech block.

Figure 18 is an inverted plan view of the feed lever and the parts contiguous thereto.

Figure 19 shows a section through the guard or casing containing the fire regulating mechanism, the trigger and other connected parts, the section being along the line 19—19 of Fig. 20 and looking in the direction of the arrows.

Figure 20 is a plan view of the guard or casing shown in section in Fig. 19, with the parts contained therein as detached from the piece.

Figure 21 shows a section along the line 21—21 of Fig. 20, and looking in the direction of the arrows, parts being shown in elevation; and Figure 22 is a similar section to Fig. 21, parts being removed to show the escapement arrangement.

The barrel A is fitted near the muzzle with a front sight carrier ring B, supporting the front sight $b$. The barrel is also provided near its middle with a vent or gas port $a'$ connecting the bore $a^2$ with port $c'$, drilled in the rest carrier ring C which is provided with the gas nozzle $c^6$ in the center of the nozzle head $c^3$, see Figs. $6^a$ and 16. The perforation $c'$ is continued outwards, as at $c^7$, for facility of cleaning out the ports $c'$ and $a'$, and the outer opening is normally closed by a screw $c^8$ which is preferably angular headed, as shown, for convenience of turning and removing. The rings B and C have a driving fit on the barrel A, and are secured by the pins $b^2$ and $c^2$.

The rest carrier ring is provided with trunnions $c^4$ and $c^5$, see Figs. 2 and 16, which are preferably screw threaded as shown in Fig. 16, to engage the heads of the upper ends of the muzzle supporting legs T, as will be hereinafter more fully described.

The enlarged breech end $a^5$ of the barrel A is provided with screw threads $a^6$ engaging in the front end of the receiver E; the direction of the screw threads being similar to that of the rifling, so that the barrel will not tend to unscrew under the reaction of the bullet engaging the rifling of the barrel when the gun is fired.

The barrel is also provided with a recess $a^7$ to engage a lug that will be hereinafter described.

A sloping recess $a^9$ is provided in the rear face of the barrel, see Fig. $6^a$, to facilitate the entrance of the cartridge into the chamber $a^8$, and a recess $a^{10}$ is also provided for the extractor claw and head.

The receiver E is attached to the rear end of the barrel and forms a housing for most of the operating mechanism of the piece. The receiver is cut away at the forward portion of its top, as at $e'$, to receive the feed block F and this open portion is closed by a lid G hinged at its forward end to the receiver, as at $g'$, and at its rear end provided with a spring catch $g^3$.

The rear sight H is mounted on the top of the lid, see Fig. 6, and the feed lever P is mounted inside the lid, as will be hereinafter described, see Figs. $6^a$, $7^a$, 13 and 14.

The rear and lower faces of the receiver E are closed by the stock carrier I (see Figs. 1, 6, 7, 8 and 9). The stock carrier is provided with grooves $i'$, see Fig. 13, engaging corresponding ribs $e^2$ of the receiver. The pin $i^3$ is locked when the lid is closed by the lug $g^4$ (see Fig. 9) on the catch $g^3$, which lug $g^4$ engages in the annular groove $i^2$ in said pin $i^3$.

The walls $e^3$ of the receiver E guide the motor piston J, see Figs. $7^a$ and 14. The bottom of this motor piston slides on the stock carrier I, see Figs. $6^a$, $7^a$, 13 and 14. The receiver is provided with two ribs $e^5$ to support and guide the breech block K, see Figs. 7, 8 and 14. These ribs are interrupted at $e^6$ in front of the fermeture abutments $e^7$, see Figs. $7^a$ and $8^a$, which abutments are fitted in bosses $e^{07}$ in the receiver, as shown in Fig. 12; which abutments $e^7$ are held in place by pins $e^{08}$. The front of the receiver E is threaded, as at $e^8$, to receive the barrel, and has an opening $e^9$ for the passage of the motor piston J. It is also provided with a recess to receive the hand guard U, which will be hereinafter described, see Figs. $6^a$, $7^a$ and $8^a$.

The receiver is also provided with a perforation $e^{13}$ to receive the lug $u^2$ (see Fig. 15), the function of which lug will be hereinafter described.

The right side of the receiver is provided with a rib $e^{11}$, see Figs 9 to 14, to guide the cocking piece L. The receiver is slotted, as at $e^{10}$, see Figs. 12 to 14, for the passage of the cocking stud $l^2$, shown in dotted lines in Fig. 2 and also in section in Fig. 7. This cocking piece L is provided with a handle $l'$ and is guided by the rib $e^{11}$ of the receiver and the rib $i^{14}$ of the stock carrier, as shown in Figs. 12 to 14. At its rear end a spring stop (not shown) secures the cocking handle normally in its forward position while the piece is being fired.

The motor piston J is actuated by the alternate action of the powder gases, reaching the nozzle through the ports $a'$, $c'$ and $c^6$, and the return spring $n^9$ which is mounted in the stock, as will be hereinafter more fully described.

The forward part of the motor piston is provided with a cup-shaped head $j$ which engages the nozzle head $c^3$. Into this cupped portion $j$ the powder gases enter when the bullet has passed the gas port $a'$ and these powder gases drive the piston to the rear, as is well known in the art. The motor piston is preferably made hollow to reduce the weight, and is provided near its center with a central vertical slot $j^2$ (see Figs. $6^a$, $8^a$ and 15) to permit the passage of the ejected cartridge cases, as will be hereinafter described.

The rear portion of the motor piston J is squared on three sides, see Fig. 14, and is guided by the side walls of the receiver E and the upper face of the stock carrier I.

Figure 1:
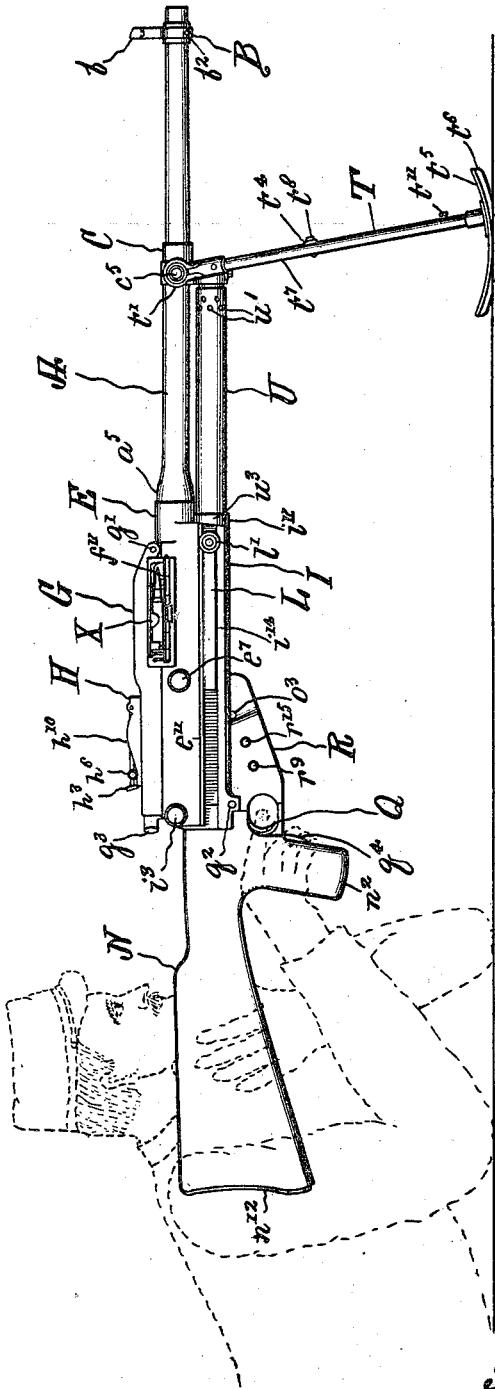
Figure 1 is a side elevation of the complete weapon, showing the muzzle support therefor, and the soldier lying down, the latter being shown in dotted lines.

The motor piston is provided on its right side with a recess $j^3$, see Figs. 7, 7ª, which recess is open to the front, and into which projects the cocking stud $l^2$ when the cocking handle is pulled to the rear; but this stud is normally clear of this recess $j^3$ during the ordinary operation of firing the piece, that is when the cocking piece is in the forward position shown in Fig. 1, and thus this cocking stud does not interfere at all with the free movement of the motor piston except when it is desired to cock the piece by hand.

The motor piston J is provided on its lower side with the notches $j^{11}$ and $j^{13}$ (see Fig. 6ª), and with a recess $j^9$ for the lever $r^3$ which controls the segmental gear $r'$, as will be hereinafter described (see Fig. 8). On its upper side the motor piston is provided with the abutment $j^5$ which drives the breech block K backwards and forwards, see Figs. 6ª and 14, which abutment is provided with a socket $j^6$ to engage the head of the firing pin M; the firing being effected by the forward movement of the firing pin under the control of the motor piston, there being no firing spring of any kind.

The motor piston is also provided on its rear upper face with a lifting cam $j^7$, and with a recess $j^{15}$ for the link D, see Figs. 6ª and 13, which will be hereinafter more fully described. The rear face $j^{14}$ of the motor piston may strike the face $i^{12}$ of the stock carrier (see Fig. 8), when the motor piston reaches the maximum limit of rearward travel, or in full recoil. The rear end of the motor piston has a socket $j^{12}$ to engage the stem $j^4$, see Fig. 8, which connects the piston with the cap $n^6$ of the return spring $n^9$. This return spring is contained in a tube $n^5$, housed in the stock N, see Figs. 6, 7 and 8, and this tube is brazed or otherwise secured in a projection $i^3$ of the stock carrier I, which projection projects into the stock, as shown in Figs. 6, 7 and 8. The outer end of the tube is provided with a head $n^{10}$, into which the screw $n^4$ engages, which screw fastens the head $n^{10}$ and with it the tube $n^5$ to the stock, and the socket $n^{11}$ for the screw head being covered by the shoulder plate $n^{12}$.

A spring stop $n^7$, see Figs. 6, 7 and 8, is pressed upwards by the coil spring $n^8$ and projects into the lower forward portion of the tube $n^5$, and prevents the guard $n^6$ and the return spring $n^9$ from springing out of the tube $n^5$ when the stock is removed from the receiver, as when stripping or assembling the parts of the gun.

K represents the breech block which reciprocates in the receiver and is guided by ribs $e^5$ on the receiver which engage in a groove $k'$ of the breech block, see Fig. 14. The breech block is provided on its upper face with a cam groove, see Fig. 17, which groove is provided with a curved front portion $k^2$ and a rear straight portion $k^3$. This cam groove engages the lug $p'$ on the feed lever P, see Figs. 6ª, 7 and 18, which rocks the feed lever P to the right or left as the breech block moves forwards or backwards, as will be hereinafter more fully described.

The cam groove is notched, as at $k^4$, see Fig. 17, to facilitate guiding the lug $p'$ into said groove when closing the lid G when the breech is closed. The groove $k^5$, see Figs. 6ª, 13, 14 and 17 permits the breech block, in its forward movement, to clear the ejector $f'$.

The breech block is provided with a longitudinal perforation for the firing pin M. It is also provided on its lower face with a recess for the extractor $k^8$ and extractor spring $k^{08}$, see Figs. 6ª and 8, the extractor being held in place by the hood $k^7$. The breech block is provided with a chamber $k^{11}$ opening downwards, into which projects the tenon $j^5$ of the motor piston, which tenon has a limited play in this chamber $k^{11}$, as shown most clearly in Figs. 6ª and 8. The forward face of this tenon engages the head $m^2$ of the firing pin, and the firing pin M consequently has a slight reciprocating movement relative to the breech block.

The motor piston is connected at its rear with the link D, see Figs. 6ª, 7, 8 and 13, which controls the fermeture dog $k^9$, whose forward end is pivoted to the breech block, as at $k^{10}$. The function of this fermeture dog is to lock the breech block in the forward position when the breech block is in the closed and firing position.

The link D is secured to the fermeture dog $k^9$ by means of the pivot pin $d'$, passing through the side lugs $k^{13}$ of said dog, and held in place by the sides of the receiver E. The other end of the link D is connected to the motor piston by means of the pin $d^2$, and this pin $d^2$ passes through an elongated slot $d^3$ in the link D, the reason for the elongation of the slot being hereinafter described.

The cartridges are fed to the receiver by means of well known feed strips X, see Fig. 2, with the cartridges below the strip. The strip X is inserted by the operator in the feed block F, see Figs. 1, 2, 6ª, 7ª, 8ª, 13 and 14. This feed block F is held in the slot $e'$ of the receiver E by means of the flanges $f^8$, see Figs. 3, 4, 13 and 14, and by the lid G. Thus, the feed block may be readily removed when desired.

The feed block F is provided with the feed strip guides $f^3$ and $f^4$, and is also provided with the wedge-shaped tongue $f^5$ to tear loose the cartridges (see Fig. 14). It is also provided with the cartridge abutments $f^6$ and $f^7$.

The ejector $f'$ is also rigidly attached to the feed block, as shown in Figs. 6ª, 13 and 14.

The feed block F is provided on its upper side with a recess $f^9$ for the passage of the pawl $g^2$ journaled on the hinge pin $g'$ of the lid G, see Figs. 6ª, 7ª and 8ª.

The openings for the passage of the feed strips are closed by two spring shutters, see Figs. 3, 4 and 13 and 14. One of these shutters $f^{11}$ on the right side is opened by hand before loading and is closed after firing. The other shutter $f^{10}$ on the left side is automatically opened during firing by the advancing feed strip and is closed by a coil spring $f^{12}$, see Fig. 4.

Figure 2:
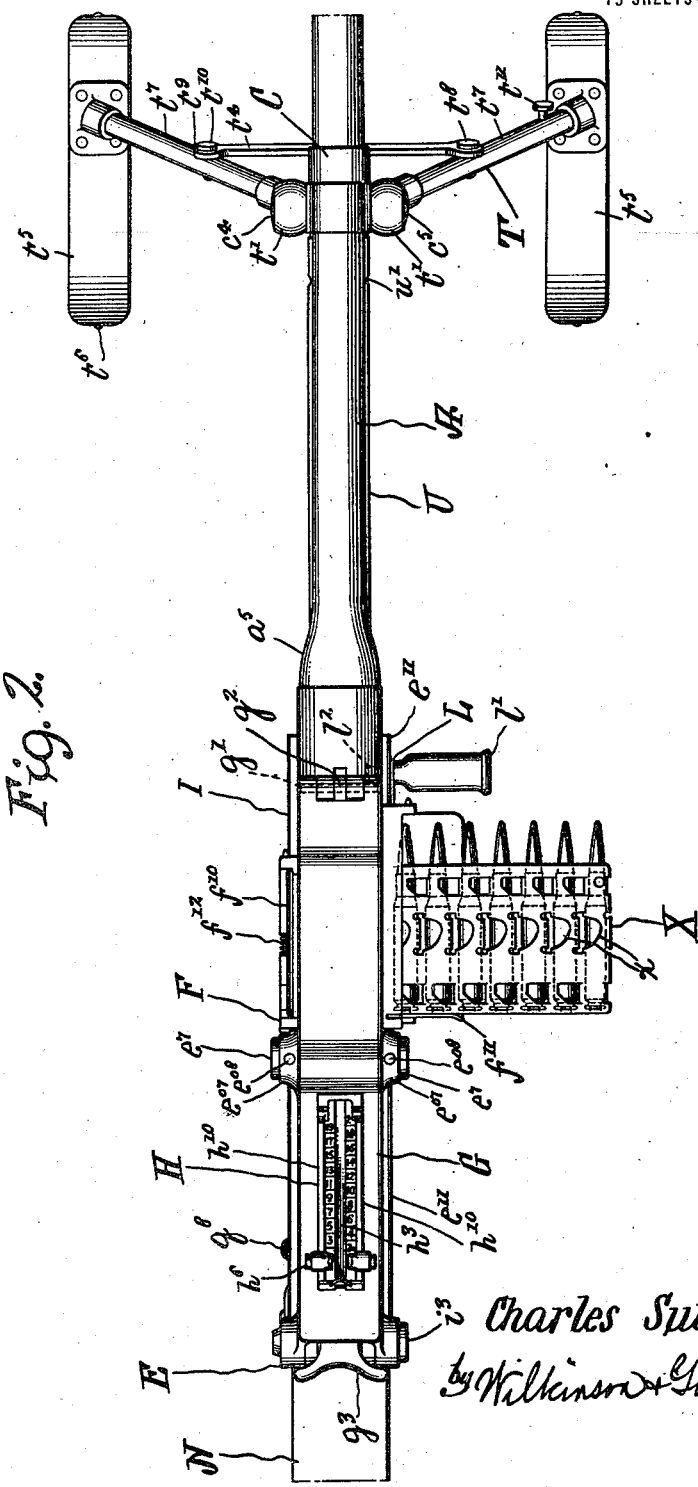
Figure 2 is a plan view, on a larger scale, of the piece shown in Fig. 1, the stock being cut away.

The feed strip X is actuated by the claw $p^2$ of the feed lever P (see Figs. 6ª, 7ª, 8ª and 14), which claw engages in one of the central openings $x$ of the strip, see Fig. 2.

The feed lever P swings on the horizontal axis $p^3$, see Figs. 6, 8 and 18, which is journaled in the lugs $p^{06}$, carried by the socket piece $p^6$, which is journaled on the vertical gudgeon $p^9$, and thus the feed lever has a limited rocking motion both in the vertical and in the horizontal plane. The socket piece $p^6$ is secured within the lid G by two clips $g^5$ and $g^6$; the clip $g^5$ being secured to the lid and the clip $g^6$ being held between the lid and two studs $g^7$, and pressed against the socket piece $p^6$ by the spring $g^8$ of the lid catch, see Figs. 6, 8 and 18. The gudgeon $p^9$ passes through the top of the lid and is held against it by the spring $h^7$ of the rear sight when the latter is in place, see Figs. 6 and 8. The lug $p'$ on the bottom of the feed lever P (see Figs. 6 and 18) is midway between the pin $p^3$ and the claw $p^2$. This lug engages in the cam groove $k^3$ on the breech block K under pressure of the spring $p^5$, see Figs. 6 and 8, and engages in the front portion of the cam groove when the breech block is open.

The heel of the feed lever P is beveled as at $p^4$, see Figs. 6 and 10, so that the lug $p'$ may be in position, when the lid G is opened, to engage the cam groove of the breech block K, either in the part $k^2$ or $k^4$ of said groove, and also when the lid is closed, this irrespective as to whether the breech is fully open or fully closed. This permits the lid to be closed irrespective of whether the breech block is in the forward or the rear position.

When the lid is open, the spring $p^5$ presses the beveled heel $p^4$ against the roller $g^{10}$, see Figs. 8 and 10, which roller is carried on the end of the pin $g^9$ of the catch $g^3$; this causes the lug $p'$ to be moved to the extreme left, which is the position rearward.

The rear sight H is fixed to the lid G by means of two clips $h'$, see Figs. 6, 7 and 8, which clips enter the slots $g^{11}$ and are secured by the gudgeon $p^9$ passing through the plate $h^4$ of the rear sight frame, and also through the lid G. The leaf spring $h^7$ of the rear sight fits into a mortise $h^2$, see Figs. 6, 7 and 8. This spring, in addition to its usual function of pressing the sight leaf $h^3$ and the slide $h^6$ on the sight base, presses the gudgeon $p^9$ in its socket and keeps the trunnions $h^5$ on the sight lift inside their journal bearings which are provided in the rear sight frame, see Figs. 2 and 6. The slide $h^6$ on the rear sight, see Figs. 2 and 10, is cylindrical, which assures greater accuracy in the contact point with the profile sides $h^{10}$, see Figs. 1, 3 and 4, of the rear sight base, than is the case with the usual slide hitherto employed.

The trigger and sear and the device producing the rate of firing will now be described.

Referring especially to Figs. 6, 7, 8 and 19 to 22, R represents a guard or casing in which most of the parts of the firing and regulating mechanism are mounted. This guard R is secured to the trigger and safety holder $q^{10}$, see Fig. 22, and these two parts are fixed to the stock carrier I by the nose $r$ of the guard R and by the trigger pin $q^2$, which passes through the hole $q^{02}$, see Figs. 20 and 22. This trigger pin $q^2$ is locked in place by its stud $q^7$, which stud engages in a groove $i^{07}$ in the stock carrier, see Fig. 9, when the pin is turned by means of the lever $q^8$ against the stop pin $r^9$, see Fig. 4.

On this pin $q^2$ are journaled the trigger Q and the sear S, see Figs. 20 and 21. The trigger Q has a finger piece $q'$ and notch $q^3$, and a second or safety notch $q^{12}$. In this safety notch $q^{12}$ the nose $q^5$ of the safety lever $q^4$ normally engages, see Figs. 19 and 21. The spring $q^6$, see Figs. 6, 20 and 21, presses the head of the safety piece to the rear, causing the lower arm of said safety piece to engage the shoulder $q^{04}$, see Figs. 6 and 22, of the trigger and safety holder $q^{10}$; and at this time the arm $q^5$ will engage the safety notch $q^{12}$, see Figs. 6 and 21, and the trigger cannot be moved unless, before pressing it with the finger, the safety lever $q^4$ is drawn rearward. This is done by the hand which normally grasps the pistol grip $n^2$, the safety lever and the trigger being both shown in the rearward position in Fig. 8.

The sear S connects the trigger Q with the segmental clutch gear $r'$, shown in Figs. 6, 7, 8, and 19 to 21. The said sear S has a nose $s'$, an arm $s^2$ and a stop $s^3$ which is pressed forward into the engaging position with the notch $q^3$ of the trigger by the spring $q^6$, see Fig. 21. Projecting transversely through the guard are the three pins $r^9$, $r^{15}$ and $o^3$, see Figs. 19 to 21. The pin $r^9$, on which is pivoted the segmental clutch member $r'$ and the vibrator $r^{10}$, is kept in place by the spring lever $q^8$ for which it serves as a stop, see Figs. 4 and 10. The pin $r^{15}$, for the gear $r^{12}$ and the whirl $r^{14}$, is held in place by the lever $r^{18}$, see Figs. 4 and 20. This lever is held in the notch $i^{18}$ of the stock carrier, see Fig. 11, and between the stock carrier I and the guard R. The pin $o^3$, on which is pivoted the motor piston locking lever O, is held against being removed by the side walls of the slot $i^9$ of the stock carrier I, as shown in Fig. 12.

The locking lever O for the motor piston is provided with a claw $o'$ adapted to engage the cocking notch $j^{11}$ of the motor piston. This claw is normally pressed upwards by means of the spring $o^2$, see Figs. 8 and 21, and the lever O is also provided with a tail $o^4$ for automatically controlling the action of the claw $o'$, as will be hereinafter described.

The segmental clutch gear $r'$ connects the sear S, actuated by the trigger Q, with the locking lever O. This segmental gear $r'$ has an escape notch $r^7$, see Fig. 21, adapted to engage the arm $s^2$ of the sear S. It also has a notch $r^6$ which is adapted at another instant to engage the arm $s^2$, see Fig. 8. This member $r'$ has two laterally projecting shoulders $r^4$ and $r^{04}$, between which projects the control lever $r^3$ which is pivoted on the pin $r^9$, see Fig. 21. The lever $r^3$ is normally pressed against the shoulder $r^4$ by means of the spring $r^5$. The member $r'$ is provided with a cam face $r^8$, see Figs. 19 and 21, which actuates the tail $o^4$ of the locking lever O.

The helical spring $r^2$, see Figs. 6, 7, 8 and 19 to 21, is looped over the segmental member $r'$ and has its ends bearing on the shoulders $q^{11}$ of the trigger holder $q^{10}$. Looking from the right of the gun, this spring will tend to rotate the member $r'$ clockwise until the abutment $r^{16}$ engages the ratchet $r^{12}$, see Figs. 6, 7, 8 and 21. The teeth on the segmental member $r'$ engage with those on the periphery of the ratchet $r^{12}$. The ratchet $r^{12}$ is provided with elongated teeth $r^{20}$, see Figs. 11 and 20, and also is provided with clutch teeth $r^{21}$ which engage the corresponding clutch teeth $r^{22}$ of the whirl $r^{14}$; the teeth $r^{21}$ and $r^{22}$ being normally pressed into engagement by the spring $r^{17}$ which is rigidly attached to or integral with the whirl $r^{14}$. These teeth $r^{21}$ and $r^{22}$ are ordinary ratchet teeth, and are so shaped that the ratchet $r^{12}$ will turn the whirl $r^{14}$ when the lever $r^3$ is rotated clockwise, but will not turn the whirl when the lever $r^3$ is rotated anti-clockwise.

When the whirl is rotated, a slowing down or braking effect is secured, as its circumferential teeth alternately engage and disengage the two teeth $r^{11}$ of the vibrator $r^{10}$; the movement being similar to the escapement of a watch.

The weight and gravity center of this vibrator $r^{10}$ are so calculated as to allow the whirl $r^{14}$, and therefore the segmental member $r'$, a predetermined low speed of rotation.

The stock N is fitted with a pistol grip $n^2$, and is fixed to the stock carrier I by the tube $n^5$ and the bolt $n^4$.

A projection $i^4$ on the boss $i^8$ prevents the stock from turning on the tube $n^5$ and the recess in the pistol grip allows the safety lever to be pressed back, see Fig. 8.

For convenience in firing lying down, the gun is provided with a muzzle support T, comprising two legs $t^7$, see Figs. 1 to 5, which legs are provided with heads $t'$ pivoted on the threaded trunnions $c^4$ and $c^5$ of the rest carrier ring C, to which heads the pivot bolts $t^3$ are attached to which the legs $t^7$ are hinged. Each of these legs is provided with a curved shoe $t^5$, preferably provided with a rib $t^6$ adapted to engage in the ground. The two legs are spaced apart by means of the brace $t^4$ which is hinged to one of the legs, as at $t^8$, and is provided at its other end with a hook $t^9$ which engages over the lug $t^{10}$ on the opposite leg. When folded up out of use the hook $t^9$ of the brace $t^4$ engages the lug $t^{11}$ on the same leg with its pivot $t^8$, see Fig. 5.

The piece may be fired directly from the shoulder with the soldier either in the erect or in the kneeling position, or it may be fired with the soldier lying down with the stock pressed against the shoulder, as shown in Figure 1. When the gun is being carried, the muzzle support would ordinarily be folded back to the position shown in Figure 3. Owing to the width of the shoes, the legs do not sink unequally into the ground, although the latter may be quite soft, as the usual pointed ends of such muzzle supports do; the stability is much greater and traversing is very easy.

The ribs $t^6$ of the shoes force the shoes to slide parallel to the vertical plane through the gun barrel. Owing to the sliding of the shoes on the ground instead of vibrating during fire, as with other machine guns, the machine rifle herein described recoils parallel to the ground when used with the muzzle rest and returns to the initial position without disturbing the aim. Thus, easy holding, good stability on any ground and accuracy of fire are secured.

The hand guard U, see Figs. 1 to 4, 6$^a$, 7$^a$ and 8$^a$, is mounted beneath the barrel between the carrier ring C and the front end of the stock carrier I. This hand guard screens the front end of the motor piston during the operation of the piece. It is provided with a few openings $u'$ for the escape of spent gas. At its rear end the hand guard U is provided with a ring $u^3$, see Fig. 15, which is provided with a lug $u^2$ passing through the opening $e^{13}$ in the receiver and into a notch $a^7$ in the gun barrel A. This lug, therefore, prevents the gun barrel from turning in the receiver, under the influence of the bullet engaging the rifling. The lug also prevents the hand guard from rotating about its axis.

Figure 3:
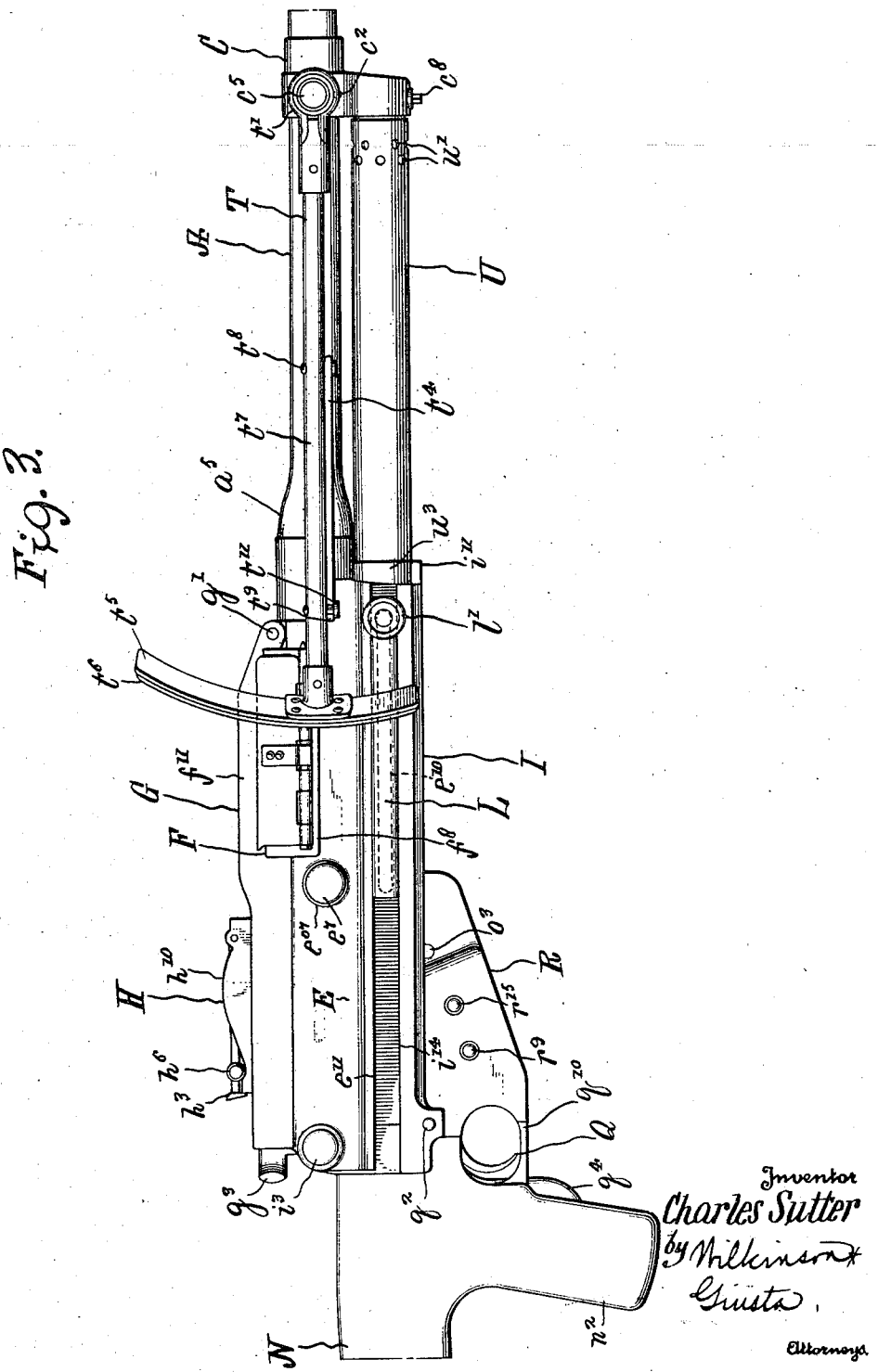
Figure 3 is a side elevation of the central portion of the piece shown in Figure 1, but with the muzzle support swung up to the position in which the piece is normally carried.
Figure 4:
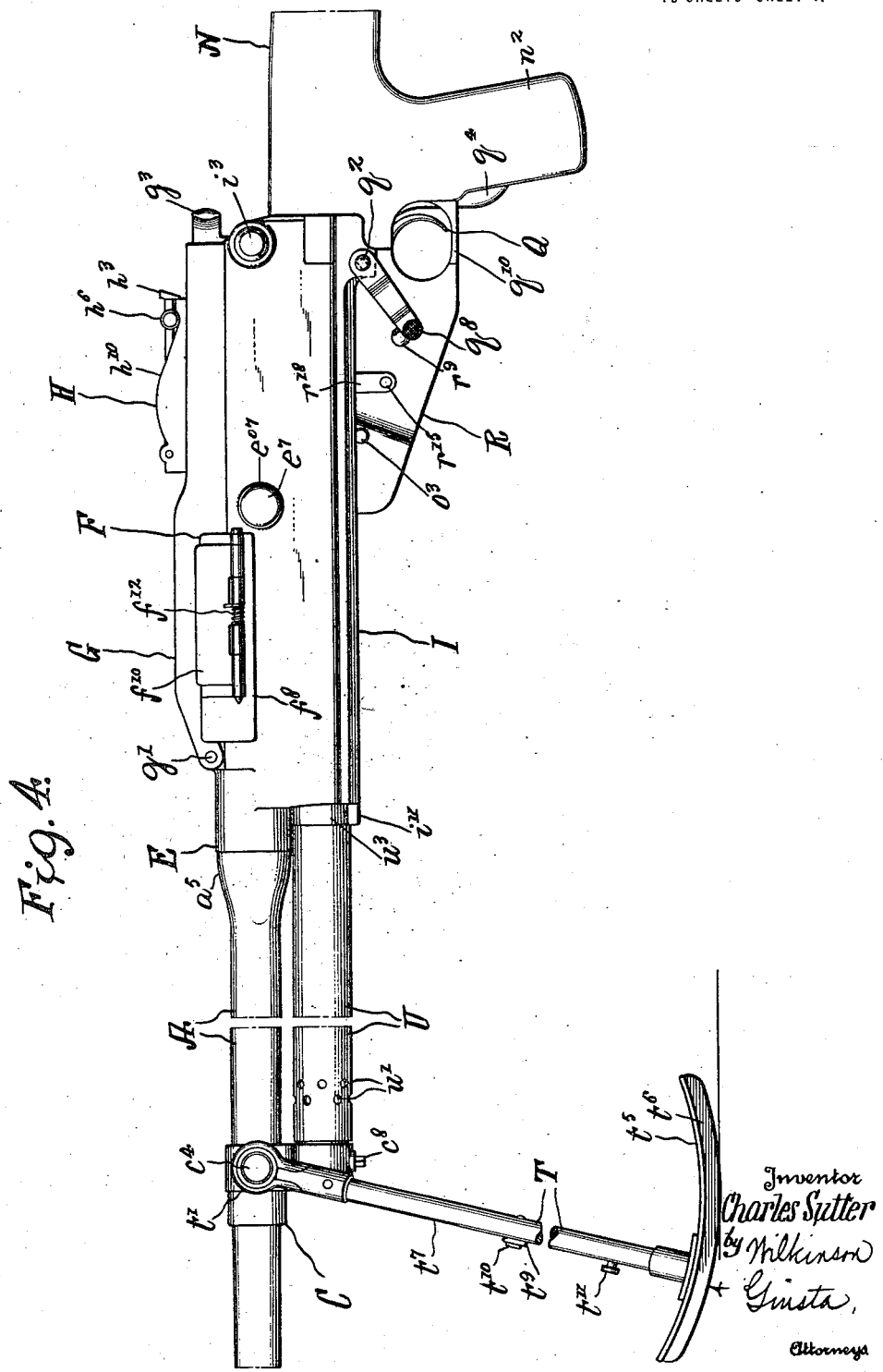
Figure 4 is a similar view to Fig. 3, but shows the opposite side of the piece, and shows the muzzle support in the lowered or operative position.
Figure 5:
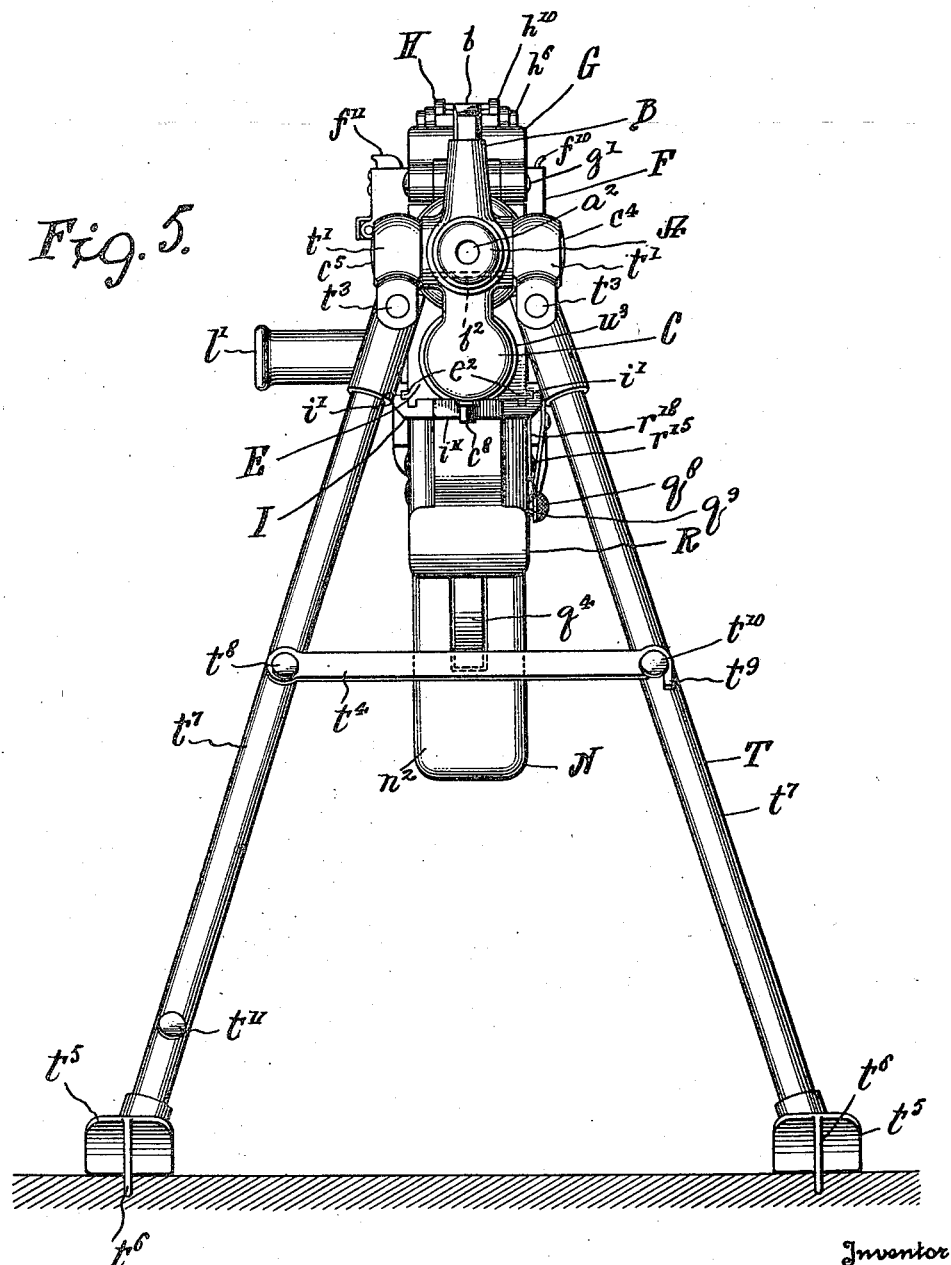
Figure 5 is a front view of the piece as seen from the muzzle, with the muzzle support in the lowered position, the same being an enlarged front view of Figs. 1 and 2.

This hand guard U is supported at its rear end by a projecting portion $i^{11}$ of the stock carrier I, see Figs. 3 and 15.

Having thus described in detail the construction of the various parts which combine to constitute the completed weapon, I will now proceed to describe the operation of the piece:—

Assume the piece to be unloaded and the parts in the initial position shown in Figs. 6 and 6ª, pull the cocking piece L backwards until its lug $l^2$ engages the notch $j^3$ in the motor piston. A further movement rearward of the cocking piece will draw the motor piston backwards against the return spring $n^9$. When the motor piston nears the end of its rearward travel, the claw $o'$ of the locking lever O will snap up into engagement with the cocking notch $j^{11}$, and a slight return movement of the motor piston will cause the claw $o'$ to engage the catch at the rear of said notch $j^{11}$, and will lock the motor piston in the rear or cocked position, see Figs. 7 and 7ª. Incident to this operation, the return spring $n^9$ is compressed, the breech block K is drawn to the rear, the firing pin M is also drawn rearward, and the various other parts are moved from the position shown in Figs. 6 and 6ª to the position shown in Figs. 7 and 7ª.

The motor piston being locked in the rear position, the piece may be loaded. To do this, open the shutter $f^{11}$ and insert in the feed block F a feed strip X with the cartridges below the same, push the feed strip home until the first cartridge is partly freed from the clips on the feed strip by the wedge-shaped tongue $f^5$, and is against the loading abutments $f^6$ and $f^7$. As the feed strip is inserted, the pawl $g^2$ and the claw $p^2$ will ride over the top of the feed strip and will engage in their respective openings.

Now to fire the piece, grasp the pistol grip $n^2$, drawing back the safety lever $q^4$ and pull back the trigger $q'$ (see Figs. 6 to 8). As will be described later, the locking lever O will be released from engagement with the motor piston and the motor piston will be free to fly forward under the action of the return spring $n^9$. Just at the moment of starting forward, the motor piston, link D and fermeture dog $k^9$ will be in the position shown in Fig. 7, when it will be seen that the fermeture dog $k^9$ cannot rise, being held down by the ribs $e^5$; but this dog, being at that time engaged by the cam $j^7$, under the action of the motor piston will push the breech block K forward. During this initial movement of starting the breech block forward, the link D is not called into play, and the pins $d'$ and $d^2$ are not subjected to strain.

As the motor piston goes forward, the lug $p'$ on the feed lever P is moved by the cam groove $k^2$ of the breech block from left to right; at the same time the claw $p^2$ of the feed lever is forced across the top of the feed strip and snaps, under pressure of the spring $p^5$, into the next central opening to the right of the feed strip, see Figs. 2, 6ª and 18. A further movement of the feed lever is now arrested, due to the fact that the lug $p'$ is now in the straight run $k^3$ of the cam groove, see Fig. 17; and as the breech block continues its forward movement it will push the first cartridge into the chamber $a^8$ at the rear of the barrel, the front upper surface of the breech block engaging the rear of the cartridge and pushing the same home.

As the breech block nears the closed position, the claw of the extractor $k^8$ moves outward along the sloping face of the recess $a^{10}$, and rides over the cartridge rim, see Figs. 6ª and 8ª, and the claw of the extractor will then engage in the cannelure of the cartridge case. Near the end of this forward movement of the breech block, when the side lugs of the fermeture dog $k^9$ register with the cuts $e^6$ in the ribs $e^5$ (see Fig. 8ª), the dog $k^9$ is lifted by the cam $j^7$ on the motor piston and the lugs $k^{13}$ of said dog are forced against and in front of the fermeture abutments $e^7$ mounted in the receiver, see Figs. 6ª, 8ª and 12. Thus, the breech block is locked, and the parts then assume the position shown in Fig. 6ª, and the dog $k^9$ cannot move either backwards against the abutments $e^7$ or upwards against the face $k^{16}$ of the breech block, or downwards against the face $j^{10}$ of the motor piston.

Thus it will be seen that the breech block is firmly locked in place against rearward, lateral and vertical strains just before the motor piston returns to the initial position, as indicated in Fig. 6ª. After the breech block has been locked in place as just described, the motor piston has a slight further forward movement, in which the tenon $j^5$, see Fig. 6ª, moves forward in the recess $k^{11}$, and the firing pin M is pushed forward by the tenon $j^5$ and strikes the primer and fires the cartridge. At the moment when the cartridge is fired, the motor piston has reached the forward limit of its travel and the head $j'$ of the piston engages over the head $c^3$, the parts being then in the position shown in Figs. 6 and 6ª.

It will be noted that, when the breech block is locked as just described, the axis of the breech block and the pins $k^{10}$ and $d'$ will all be in line as shown in Fig. 6ª, and as a result the pressure on the breech block is transmitted rearward as a direct thrust, without any tendency to bind vertically or laterally.

The powder gases escaping through the vent $a'$, as soon as a bullet has passed this vent, will enter the cup-shaped end of the piston and will exert a brief but sudden pressure sufficient to throw the piston J backwards, compressing the return spring $n^9$. As the motor piston J moves to the rear, the firing pin M is withdrawn within the breech block; the pin $d^2$ engages the sides of the ovalized hole $d^3$ of the link D, see Figs. 6a and 13; and, before the rear face of the tenon $j^5$ comes in contact with the rear wall of the recess $k^{11}$, the link D is drawn downwards, and lowers the fermeture dog $k^9$, disengaging its side lugs $k^{13}$ from the fermeture abutments $e^7$. Then, as the tenon $j^5$ pushes the breech block rearward, the action of the link D comes to an end, owing to the oval or elongated shape of the hole $d^3$.

The lower face of the fermeture abutments $e^7$ acts like a cam on the top face of the side lugs $k^{13}$ of the dog $k^9$, see Figs. 6, 12 and 13, the fermeture dog, being now inclined, and these abutments force the fermeture dog down in the recess $j^8$ of the piston. The side lugs $k^{13}$ will then pass under the ribs $e^5$ in the receiver and the breech block will continue to move to the rear under the direct pressure of the motor piston.

The claw of the extractor $k^8$ still being engaged in the groove of the spent cartridge case will withdraw the same from the barrel and drag the empty cartridge case rearward until its head strikes the ejector $f'$, when the empty cartridge case is snapped downward by the action of the ejector over the ejector opening $j^2$ in the motor piston, and through the opening $i^5$ in the stock carrier. These openings are so arranged as to permit the cartridge case to be ejected through the same at the proper instant of the travel of the motor piston.

It will be noted from Fig. 8a that the openings $j^3$ and $i^5$ preferably register at approximately the limit of the travel of the motor piston to the rear.

During the first part of the recoil of the breech block K, the lug $p'$ of the feed lever is in the straight part of the cam groove, and the claw $p^2$ does not move; but when the curved part $k^2$ of the cam groove referred to reaches this lug, this cam groove rocks the feed lever to the left, causing the claw $p^2$ of the feed lever to push the feed strip to the left, bringing a fresh cartridge underneath the stripping tongue $f^5$, and against the loading abutments $f^6$, $f^7$, in position to be returned for re-loading the piece.

If the trigger be still held to the rearward, and the safety lever $q^4$ also drawn to the rearward, the motor piston will be free to return forward again under the action of the return spring $n^9$, and the gun will continue to fire automatically as long as the cartridges in the feed strip last. Backward motion of the feed strip X is prevented by the pawl $q^2$ fitted with its spring to the hinge $g'$ of the lid G. When the lid is closed, the pawl engages in one of the front openings in the feed strip, when a cartridge is in the loading position, and will allow the feed strip to be moved to the left, but will prevent any motion to the right. It will be noted that in the automatic action of the piece a live cartridge is introduced into the powder chamber just before percussion, and that the breech is opened only by and after the explosion; the result being a maximum of safety in case of jams, misfire or hang fire. When the last cartridge of a feed strip has been fired, as the breech block recoils, the empty strip is thrown out of the feed block. As the claw $p^2$ of the feed lever is then no longer held up on the feed strip, it is depressed by the spring $p^5$ and a notch at the back of the lug $p'$ catches in a small recess at the top of the front face $k^{15}$ of the breech block, see Fig. 7 and arrests the breech block K at the rear, and incidentally will prevent the motor piston from returning to the initial position.

Thus, when the cartridges have been exhausted from the feed strip, the firing stops and the breech is kept open. If desired at any time, a partially used feed strip may be easily withdrawn. Opening the lid G disengages the pawl $g^2$ and the claw $p^2$ from the openings in the feed strip, and the latter is then easily withdrawn from the feed guides to the right.

The foregoing description of cocking by hand, and the automatic firing of the piece, contains no special reference to the operation of the trigger and the parts controlled thereby, or the safety lever, or the regulator; the operation of which parts will now be described in detail.

The parts referred to are shown in their assembled relation to the piece in Figs. 6, 7 and 8, and on a larger scale in the cross sectional views in Figs. 9 to 12, inclusive, and as detached in Figs. 19 to 22.

Suppose the breech to be in the closed position and the piston J in the forward position, and together with the other parts to be in the initial position shown in Figs. 6 and 6a; when the piston is pulled backward by hand by means of the cocking piece L, the rear and lower face $j^{14}$ of the motor piston J passes over the catch $o'$ of the locking lever O and strikes the head of the clutch lever $r^3$, swinging said lever backwards. This gives the segmental gear $r'$ an anti-clockwise rotation, and the teeth $r^{21}$ permit the ratchet wheel $r^{12}$ to turn idly. The tail $o^4$ of the locking lever O no longer engages the cam $r^8$, and, therefore, under the action of the spring $o^2$, see Fig. 21, the catch $o'$ is free to snap up into engagement with the cocking notch $j^{11}$ in the motor piston. The motor piston is thus cocked and stopped at the rear; the part $j^{14}$ having passed beyond the head of the lever $r^3$ and the recess $j^9$ registering with the head of this lever, the lever $r^3$ will swing up into said recess $j^9$ under the action of the spring $r^2$. This spring will rotate the segmental gear $r'$ and with it the lever $r^3$ clockwise, but at reduced speed, as the ratchet $r^{12}$ now engages the whirl $r^{14}$, and therefore the vibrator comes into action. The action of the vibrator continues until the notch $r^6$ engages the arm $s^2$ of the sear S, which will stop the rotation of the vibrator. The gun is now cocked under the action of the stop lever O, and the cam $r^8$ in this position almost engages the tail of the lever O. If the operator now presses first the safety lever $q^4$, and then the trigger $q'$, the notch $q^3$ engages the sear S whose arm $s^2$ is withdrawn from the notch $r^6$. The gear $r'$ will continue its rotation and the cam $r^8$ will engage immediately the tail $o^4$ of the lever O.

Lifting the heel of said lever will lower the catch $o'$, leaving the piston free to move forward under the action of the return spring $n^9$ and a round is fired.

As the piston goes forward its lineal motion is much faster than that of the lever $r^3$, which latter is checked by the shoulder $r^8$. Whether the rotation of the segmental gear $r'$ has or has not been stopped by the abutment $r^{16}$ meeting the body of the ratchet, the part $j^{14}$ of the piston encounters the head of the lever $r^3$ and this head yields and is pressed down, compressing the spring $r^5$, and as soon as the motor piston passes the said lever $r^3$, the lever will rise behind it under the action of the spring.

Under the impulse of the powder gases, the piston is thrown to the rear and the operations hereinbefore described are repeated as long as the trigger is pressed and as long as there is any cartridge left in the feed strip. Thus, automatic fire is obtained, in which for every round the gun is automatically cocked and fired; the time between these two actions is determined not only by the time interval ordinarily required in the reciprocating of the motor piston, but also by the slowing down effect of the regulator mechanism which is so constructed as to obtain a predetermined rate of fire.

If, while the operation of automatic firing is continued, the trigger is released the parts are brought to rest with the breech block in the open position and the piston cocked, as shown in Fig. 7. When the trigger is released, as just described, the sear S will stop the clockwise rotation of the gear $r'$ after the cocking action has been effected and just before the catch $o'$ is thrown into engagement with the cocking notch in the motor piston.

To sum up, once the gun has been cocked by hand, assuming, of course, the feed strip to be in place, automatic fire is produced mechanically by the segmental gear $r'$ which serves as an escapement and operates at a predetermined speed as long as the trigger is pressed and the safety lever drawn to the rear.

If, during automatic fire, the feed strip has been entirely exhausted of cartridges before the trigger is released, the lug $p'$ of the feed lever P holds the breech block to the rear, as already described, and a little further to the rear than in the normal cocked position of the motor piston. The motion of the piston is for this purpose slightly greater than that of the cocking handle, as will be seen by a comparison of Figs. 7 and 8.

When the motor piston is in its rearmost position, see Fig. 8, as the axis of the recess $j^9$ is to the rear of the pin $r^9$, the lever $r^3$ engages the upper wall of this recess and is stopped a little before said lever reaches its vertical position. The gear $r'$ is stopped by engagement with the shoulder $r^4$ before the cam $r^8$ engages the tail $o^4$ of the lever O, and therefore the catch $o'$ of said lever is not lowered and is held in the position shown in Fig. 8. Now when a fresh feed strip is introduced, the lug $p'$ of the feed lever P is freed from the breech block K and permits the motor piston to move forward slightly from the position shown in Fig. 8 to that shown in Fig. 7, in which case the catch $o'$ engages the abutment at the rear end of the cocking notch $j^{11}$ and the motor piston is still held locked. Had the lever $r^3$ not been stopped, and the catch $o'$ been lowered, as in the ordinary automatic operation of the gun, the piston would have moved immediately forward before the feed strip could be fully pushed to the loading position, and it would have been necessary to recock the gun by hand before the firing could be continued.

It will be noted that whether the piston is in the furthest rear position, as indicated in Fig. 8, or after it is moved slightly forward on the return, as indicated in Fig. 7, the catch $o'$ will project up into the cocking notch $j^{11}$ and will positively prevent the motor piston from flying forward again and firing the newly inserted cartridge until the trigger is pulled again. Thus, this arrangement serves as a double stop in case the lug $p'$ of the feed lever should fail to operate from any cause incident to the operation of the piece, and will render it impossible to fire the piece after a fresh feed strip has been inserted until the trigger and safety lever have both been pulled. When a fresh feed strip is inserted and the parts are in the position shown in Fig. 7, pulling the trigger and the safety lever $q^4$ will cause the operation of automatic firing to be resumed and such firing will be regulated by the arrangement hereinbefore described.

It will be noted that the sear S only acts as a connecting piece between the trigger Q and the gear $r'$. The claw $s'$ is lowered when the trigger is pressed, but should this not be the case, as the distance between the two claws $s'$ and $o'$ is smaller than that between the notches $j^{13}$ and $j^{11}$ on the bottom of the motor piston, the said piston is normally cocked by the locking lever O and not by the sear S. In event of malfunction after a cartridge has jammed between the breech block K and the barrel A, the piston J is moved sufficiently to allow the lever $r^3$ and the gear $r'$ to complete their rotation, and also the catch $o'$, but is not moved far enough to allow the surface $j^{14}$ to pass the head of the lever $r^3$. As a result, when the piston is pulled backwards by the cocking piece L it does not engage the lever $r^3$ and the catch $o'$ remains lowered, but the piece cannot be cocked, in the usual way. In this case only the nose $s'$ of the sear S engages the second notch $j^{13}$. Thus, the piece may be cocked by the second sear under the conditions stated, and when the trigger is pressed the shot is fired and the normal working of the mechanism is resumed.

If the firing regulator is damaged in any way, it does not necessarily result that the gun is thrown out of action, for if the trigger and sear S have not been injured the gun may be fired as an ordinary machine gun, in fact, if we remove from the guard R the gear $r'$, the whirl $r^{13}$ and the ratchet $r^{12}$, and the locking lever O, the gun becomes an automatic machine rifle which may be cocked on the sear S and may be fired at a high rate of speed as long as the trigger is pressed and fresh feed strips are supplied. The removal of the parts of the regulator as just described does not affect the mechanical operation of the remaining mechanism, but merely removes the means for regulating the speed of operation of the weapon.

The various parts are so constructed as to facilitate the assembling or disassembling of the mechanism, either for purposes of cleaning or repair, or for other reasons.

In order to strip the gun, or disassemble the parts, assuming the parts all to be assembled as indicated in Figs. 6 and 6ª with the breech closed: open the lid G by pulling on the catch $g^3$; remove the feed block F by pulling it upwards and forwards; remove the pin $i^3$, pulling the stock carrier I backwards, freeing the grooves I' from the flanges $e^2$; remove the connecting rod or piston stem $j^4$; withdraw both the motor piston J and the breech block K from the receiver E; remove the pin $d'$; separate the breech block K from the lug $j^5$ by pulling to the rear and upwards, which separates the firing pin base $m^2$ from the lugs $j^6$; remove the firing pin M'; remove the cocking handle L which is now free from the groove $i^{14}$, by pulling it to the rear, and freeing the stud $i^2$ from the slot $e^{10}$; remove the guard R from the stock carrier I by turning the lever $q^8$ until it is in the vertical and downward position, and then remove the pin $q^2$; and then pull the guard R down and backwards, freeing its nose from the slot $i^6$.

This will expose all of the operative parts of the device, but if it is desired to further disassemble the parts, the hand guard U may be removed, also the stock carrier I, and the stock may be disengaged from the receiver at one end and the barrel unscrewed from the receiver at the other end. The return spring $n^9$ may be then removed from the stock, by freeing the cap $n^6$ by pushing inwards the spring holder $n^7$.

In order to re-assemble the parts proceed in the reverse order.

If required, one may strip: the firing regulator by removing the pins $r^9$, $r^{15}$ and $o^3$ which may be freely withdrawn when the guard R is separated from the stock carrier I, and then removing the different parts. The rear sight and feed piece may be disassembled by: pressing the leaf $h^3$ of the spring $h^7$, freeing the trunnions $h^5$ from their recesses and withdrawing the leaf; then removing the leaf spring $h$; removing the gudgeon $p^9$ by inserting the point of the firing pin in the hole drilled through the feed piece P under the gudgeon $p^9$; removing the rear sight backwards and upwards; pulling the catch $g^3$ to its rearmost position, and removing the feed lever P with the socket $p^6$ which is now free from its holders.

The parts of the gun are easily dismounted and assembled without tools, with great ease, and all are securely assembled together.

It will be seen that I provide a rear sight without pin or screw, which may be readily applied to or removed from the piece, and which is fitted with a cylindrical slide giving the greatest possible accuracy. It will also be noted that breech closing mechanism symmetrically centers all the pressures on the barrel and on the axis of the breech.

It will also be noted that I provide a loading device in which a live cartridge is introduced into the chamber only just before percussion by the final movement of the motor piston, and in which the opening of the breech is only effected by and after the explosion. This operation prevents accidents in case of misfire or hang fire due to a live cartridge remaining in a hot barrel, or to other causes.

It will be seen that the ejector slots in the motor piston and in the receiver register only when the motor piston nears the rearward limit of its travel, and thus the empty cartridge case is thrown through the slot in the motor piston, while it is substantially at rest.

It will be seen that the feed mechanism includes a feed lever which moves around two axes, one being horizontal and the other vertical. This feed lever not only pushes the feed strip transversely of the feed block in the normal operation of firing the gun, but also holds the breech open when the cartridges have been exhausted from the feed strip and after the feed strip has been ejected.

It will be obvious the various modifications might be made in the herein described construction, and in the combination and arrangement of parts which could be used without departing from the spirit of my invention; and I do not mean to limit the invention to such details except as particularly pointed out in the claims.

Having thus described my invention, what I claim and desire to secure by Letters Patent of the United States is:—

1. In a gas operated gun, the combination with a gun barrel and a receiver, provided with abutments therein, of a motor piston mounted to reciprocate in said receiver, a sliding breech block also mounted in said receiver, a fermature dog hinged to said breech block and adapted to engage said abutments, and a link pivoted respectively to said dog and said motor piston, and adapted to throw said dog into engagement with said abutments as the motor piston nears the forward limit of its travel, and to release said breech block when the motor piston resumes its forward travel, a feed block mounted in said receiver, a firing pin slidably mounted in said breech block, and feed mechanism mounted above said feed block and operated by the movement of said breech block.

2. In a gas operated gun, the combination with a gun barrel and a receiver, provided with abutments therein, of a motor piston mounted to reciprocate in said receiver, a sliding breech block also mounted in said receiver, a fermature dog hinged to said breech block and adapted to engage said abutments, and a link pivoted respectively to said dog and said motor piston, and adapted to throw said dog into engagement with said abutments as the motor piston nears the forward limit of its travel, and to release said breech block when the motor piston resumes its forward travel, means controlled by said motor piston for locking said breech block in the forward and closed position, and for releasing same when the piece is fired, a firing pin slidably mounted in said breech block, a feed block mounted in said receiver adapted to receive a feed strip, and feed mechanism operated by the movement of said breech block.

3. In a gas operated gun, the combination with a gun barrel and a receiver, provided with abutments therein, of a motor piston mounted to reciprocate in said receiver, a sliding breech block also mounted in said receiver, a fermature dog hinged to said breech block and adapted to engage said abutments, and a link pivoted respectively to said dog and said motor piston, and adapted to throw said dog into engagement with said abutments as the motor piston nears the forward limit of its travel, and to release said breech block when the motor piston resumes its forward travel, a firing pin slidably mounted in said breech block, a feed block mounted in said receiver, a lid and feed mechanism contained therein, mounted above said feed block, said feed mechanism being also operated by the movement of said breech block, said lid and said feed block being so mounted as to be quickly removable from the piece when desired.

4. In a gas operated gun, the combination
90 with a gun barrel and a receiver, of a motor piston mounted to reciprocate in said receiver, said motor piston and said receiver being provided with an ejector slot, a sliding breech block also mounted in said receiver and operated by said motor piston, an extractor carried by said breech block, a feed block mounted in said receiver adapted to receive a feed strip, an ejector carried by said feed block, opposite said ejector slot in the receiver, and feed mechanism mounted above said feed block and operated by the movement of said breech block, substantially as described.

5. In a gas operated gun, the combination
105 with a gun barrel and a receiver, of a motor piston mounted to reciprocate in said receiver, said motor piston and said receiver being provided with an ejector slot, a sliding breech block also mounted in said receiver and operated by said motor piston, an extractor carried by said breech block, a feed block mounted in said receiver adapted to receive a feed strip, an ejector carried by said feed block, opposite said ejector slot in the receiver, and feed mechanism mounted above said feed block and operated by the movement of said breech block, said feed mechanism and said feed block being so mounted as to be quickly removable from the piece when desired, substantially as described.

6. In a gas operated gun, the combination with a gun barrel and a receiver, of a motor piston mounted to reciprocate in said receiver, said motor piston and said receiver being provided with an ejector slot, a sliding breech block also mounted in said receiver and operated by said motor piston, an extractor carried by said breech block, a feed block mounted in said receiver adapted to receive a feed strip, an ejector carried by said feed block, opposite said ejector slot in the receiver, a lid and feed mechanism contained therein mounted above said feed block, said feed mechanism being also operated by the movement of said breech block, substantially as described.

7. In a gas operated gun, the combination with a gun barrel and a receiver, of a motor piston mounted to reciprocate in said receiver, said motor piston and said receiver being provided with an ejector slot, a sliding breech block also mounted in said receiver and operated by said motor piston, an extractor carried by said breech block, a feed block mounted in said receiver adapted to receive a feed strip, an ejector carried by said feed block, opposite said ejector slot in the receiver, a lid and feed mechanism contained therein mounted above said feed block, said feed mechanism being also operated by the movement of said breech block, said lid and said feed block being so mounted as to be quickly removable from the piece when desired, substantially as described.

8. In a gas operated gun, the combination with a gun barrel and a receiver, of a motor piston mounted to reciprocate in said receiver, said motor piston and said receiver being provided with an ejector slot, a sliding breech block also mounted in said receiver and operated by said motor piston, an extractor carried by said breech block, a feed block mounted in said receiver, and an ejector carried by said feed block, opposite said ejector slot in the receiver, substantially as described.

9. In a gas operated gun, the combination with a gun barrel and a receiver, of a motor piston mounted to reciprocate in said receiver, said motor piston being provided with a vertically disposed ejector slot, and said receiver being also provided with an ejector slot, a sliding breech block also mounted in said receiver and operated by said motor piston, an extractor carried by said breech block, a feed block mounted in said receiver, an ejector carried by said feed block, opposite said ejector slot in the receiver, and feed mechanism mounted above said feed block and operated by the movement of said breech block, said feed mechanism and said feed block being so mounted as to be quickly removable from the piece when desired, substantially as described.

10. In a gas operated gun, the combination with a gun barrel and a receiver, of a motor piston mounted to reciprocate in said receiver, said motor piston and said receiver being provided with an ejector slot, a sliding breech block also mounted in said receiver and operated by said motor piston, an extractor carried by said breech block, a feed block mounted in said receiver, and an ejector carried by said feed block, opposite said ejector slot in the receiver, said ejector slots in the motor piston and in the receiver registering only when the motor piston reaches approximately the end of its rearward travel, substantially as described.

11. In a gas operated gun, the combination with a gun barrel and a receiver, of a motor piston mounted to reciprocate in said receiver, said motor piston being provided with a vertically disposed ejector slot, and said receiver being also provided with an ejector slot, a sliding breech block also mounted in said receiver and operated by said motor piston, an extractor carried by said breech block, a feed block mounted in said receiver, an ejector carried by said feed block, opposite said ejector slot in the receiver, said ejector slots in the motor piston and in the receiver registering only when the motor piston reaches approximately the end of its rearward travel, and feed mechanism mounted above said feed block and operated by the movement of said breech block, said feed mechanism and said feed block being so mounted as to be quickly removable from the piece when desired, substantially as described.

12. In a gas operated gun, the combination with a gun barrel and a receiver, of a motor piston mounted to reciprocate in said receiver, said motor piston and said receiver being provided with an ejector slot, a sliding breech block also mounted in said receiver and operated by said motor piston, a firing pin slidably mounted in said breech block, and connected to said motor piston, and constructed and arranged to strike the cartridge primer at the forward end of the stroke of said piston, an extractor carried by said breech block, a feed block mounted in said receiver adapted to receive a feed strip, an ejector carried by said feed block, opposite said ejector slot in the receiver, a lid and feed mechanism contained therein mounted above said feed block, said feed mechanism being also operated by the movement of said breech block, substantially as described.

13. In a gas operated gun, the combination with a gun barrel and a receiver, of a motor piston mounted to reciprocate in said receiver, said motor piston and said receiver being provided with an ejector slot, a sliding breech block also mounted in said receiver and operated by said motor piston, a firing pin slidably mounted in said breech block, and connected to said motor piston, and constructed and arranged to strike the cartridge primer at the forward end of the stroke of said piston, an extractor carried by said breech block, a feed block mounted in said receiver adapted to receive a feed strip, an ejector carried by said feed block, opposite said ejector slot in the receiver, a lid and feed mechanism contained therein mounted above said feed block, said feed mechanism being also operated by the movement of said breech block, said lid and said feed block being so mounted as to be quickly removable from the piece when desired, substantially as described.

14. In a gas operated gun, the combination with a gun barrel and a receiver, of a motor piston mounted to reciprocate in said receiver, said motor piston and said receiver being provided with an ejector slot, a sliding breech block also mounted in said receiver and operated by said motor piston, a firing pin slidably mounted in said breech block, and connected to said motor piston, and constructed and arranged to strike the cartridge primer at the forward end of the stroke of said piston, an extractor carried by said breech block, a feed block mounted in said receiver, and an ejector carried by said feed block, opposite said ejector slot in the receiver, substantially as described.

15. In a gas operated gun, the combination with a gun barrel and a receiver, of a motor piston mounted to reciprocate in said receiver, said motor piston being provided with a vertically disposed ejector slot, and said receiver being also provided with an ejector slot, a sliding breech block also mounted in said receiver and operated by said motor piston, a firing pin slidably mounted in said breech block, and connected to said motor piston, and constructed and arranged to strike the cartridge primer at the forward end of the stroke of said piston, an extractor carried by said breech block, a feed block mounted in said receiver, an ejector carried by said feed block, opposite said ejector slot in the receiver, and feed mechanism mounted above said feed block and operated by the movement of said breech block, said feed mechanism and said feed block being so mounted as to be quickly removable from the piece when desired, substantially as described.

16. In a gas operated gun, the combination with a gun barrel and a receiver, of a motor piston mounted to reciprocate in said receiver, said motor piston and said receiver being provided with an ejector slot, a sliding breech block also mounted in said receiver and operated by said motor piston, a firing pin slidably mounted in said breech block, and connected to said motor piston, and constructed and arranged to strike the cartridge primer at the forward end of the stroke of said piston, an extractor carried by said breech block, a feed block mounted in said receiver, and an ejector carried by said feed block, opposite said ejector slot in the receiver, said ejector slots in the motor piston and in the receiver registering only when the motor piston reaches approximately the end of its rearward travel, substantially as described.

17. In a gas operated gun, the combination with a gun barrel and a receiver, of a motor piston mounted to reciprocate in said receiver, said motor piston being provided with a vertically disposed ejector slot, and said receiver being also provided with an ejector slot, a sliding breech block also mounted in said receiver and operated by said motor piston, a firing pin slidably mounted in said breech block, and connected to said motor piston, and constructed and arranged to strike the cartridge primer at the forward end of the stroke of said piston, an extractor carried by said breech block, a feed block mounted in said receiver, an ejector carried by said feed block, opposite said ejector slot in the receiver, said ejector slots in the motor piston and in the receiver registering only when the motor piston reaches approximately the end of its rearward travel, and feed mechanism mounted above said feed block and operated by the movement of said breech block, said feed mechanism and said feed block being so mounted as to be quickly removable from the piece when desired, substantially as described.

18. In a gas operated gun, the combination with a gun barrel and a receiver, of a motor piston mounted to reciprocate in said receiver, said motor piston being provided with a vertically disposed ejector slot, and said receiver being also provided with an ejector slot, a sliding breech block also mounted in said receiver and operated by said motor piston, an extractor carried by said breech block, a feed block mounted in said receiver and adapted to receive a feed strip, an ejector carried by said feed block opposite said ejector slot in the receiver, said ejector slots in the motor piston and in the receiver registering only when the motor piston reaches approximately the end of its rearward travel, and feed mechanism mounted above said feed block and operated by the movement of said breech block.

19. In a gas operated gun, the combination with a gun barrel and a receiver, of a motor piston mounted to reciprocate in said receiver, a sliding breech block also mounted in said receiver and operated by said motor piston, a firing pin slidably mounted in said breech block, and connected to said motor piston, and constructed and arranged to strike the cartridge primer at the forward end of the stroke of said piston, an extractor carried by said breech block, a feed block mounted in said receiver adapted to receive a feed strip, a lid and feed mechanism contained therein mounted above said feed block, said feed mechanism comprising a feed lever constructed and arranged to vibrate laterally for moving the feed strip, and vertically to lock the breech block in the open position when the empty feed strip has been ejected, said feed mechanism being also operated by the movement of said breech block, substantially as described.

20. In a gas operated gun, the combination with a gun barrel and a receiver, of a motor piston mounted to reciprocate in said receiver, said motor piston and said receiver being provided with an ejector slot, a sliding breech block also mounted in said receiver and operated by said motor piston, a feed block mounted in said receiver adapted to receive a feed strip, a lid and feed mechanism contained therein mounted above said feed block, said feed mechanism comprising a feed lever constructed and arranged to vibrate laterally for moving the feed strip, and vertically to lock the breech block in the open position when the empty feed strip has been ejected, said feed mechanism being also operated by the movement of said breech block, substantially as described.

21. In a gas operated gun, the combination with a gun barrel and a receiver, of a motor piston mounted to reciprocate in said receiver, a sliding breech block also mounted in said receiver and operated by said motor piston, a firing pin slidably mounted in said breech block, and connected to said motor piston, and constructed and arranged to strike the cartridge primer at the forward end of the stroke of said piston, a feed block mounted in said receiver, a lid and feed mechanism carried thereby, mounted above said feed block, said feed mechanism being also operated by the movement of said breech block, said lid and said feed block being so mounted as to be quickly removable from the piece when desired, substantially as described.

22. In a gas operated gun, the combination with a gun barrel and a receiver, of a motor piston mounted to reciprocate in said receiver, a sliding breech block also mounted in said receiver and operated by said motor piston, a feed block mounted in said receiver adapted to receive a feed strip, and feed mechanism mounted above said feed block and operated by the movement of said breech block, said feed mechanism comprising a feel lever constructed and arranged to vibrate laterally for moving the feed strip, and vertically to lock the breech block in the open position when the empty feed strip has been ejected, substantially as described.

23. In a gas operated gun, the combination with a gun barrel and a receiver, of a motor piston mounted to reciprocate in said receiver, a sliding breech block also mounted in said receiver and operated by said motor piston, a feed block mounted in said receiver and adapted to receive a feed strip, feed mechanism mounted above said feed block and operated by the movement of said breech block, said feed mechanism and said breech block being so mounted as to be quickly removable from the piece when desired, said feed mechanism comprising a feed lever constructed and arranged to vibrate laterally for moving the feed strip, and vertically to lock the breech block in the open position when the empty feed strip has been ejected, substantially as described.

24. In a gas operated gun, the combination with a gun barrel and a receiver, of a motor piston mounted to reciprocate in said receiver, a sliding breech block also mounted in said receiver and operated by said motor piston, means controlled by said motor, piston for locking said breech block in the forward and closed position, and for releasing same when the piece is fired, a feed block mounted in said receiver adapted to receive a feed strip, and feed mechanism mounted above said feed block and operated by the movement of said breech block, said feed mechanism comprising a feed lever constructed and arranged to vibrate laterally for moving the feed strip, and vertically to lock the breech block in the open position when the empty feed strip has been ejected, substantially as described.

25. In a gas operated gun, the combination with a gun barrel and a receiver, of a motor piston mounted to reciprocate in said receiver, a sliding breech block also mounted in said receiver and operated by said motor piston, a feed block mounted in said receiver adapted to receive a feed strip, said feed block being provided with a transverse passage therethrough for the feed strip, with spring impressed shutters normally closing both ends of said passage, and feed mechanism mounted above said feed block and operated by the movement of said breech block, said feed mechanism, comprising a feed lever constructed and arranged to vibrate laterally for moving the feed strip, and vertically to lock the breech block in the open position when the empty feed strip has been rejected, substantially as described.

26. In a gas operated gun, the combination with a gun barrel and a receiver, of a motor piston mounted to reciprocate in said receiver, a sliding breech block also mounted in said receiver and operated by said motor piston, means controlled by said motor piston for locking said breech block in the forward and closed position, and for releasing same when the piece is fired, a feed block mounted in said receiver adapted to receive a feed strip, said feed block being provided with a transverse passage therethrough for the feed strip, with spring impressed shutters normally closing both ends of said passage, and feed mechanism mounted above said feed block and operated by the movement of said breech block, said feed mechanism comprising a feed lever constructed and arranged to vibrate laterally for moving the feed strip, and vertically to lock the breech block in the open position when the empty feed strip has been ejected, substantially as described.

27. In a gas operated gun, the combination with a gun barrel and a receiver, of a motor piston mounted to reciprocate in said receiver, a sliding breech block also mounted in said receiver and operated by said motor piston, a feed block mounted in said receiver adapted to receive a feed strip, a lid and feed mechanism contained therein mounted above said feed block, said feed mechanism comprising a feed lever constructed and arranged to vibrate laterally for moving the feed strip, and vertically to lock the breech block in the open position when the empty feed strip has been rejected, said feed mechanism being also operated by the movement of said breech block, said lid and said feed block being so mounted as to be quickly removable from the piece when desired, substantially as described.

28. In a gas operated gun, the combination with a gun barrel and a receiver, of a motor piston mounted to reciprocate in said receiver, said motor piston being provided with a vertically disposed ejector slot, and said receiver being also provided with an ejector slot, a sliding breech block also mounted in said receiver and operated by said motor piston, an extractor carried by said breech block, a feed block mounted in said receiver and adapted to receive a feed strip, an ejector carried by said feed block, opposite said ejector slot in the receiver, and feed mechanism mounted above said feed block and operated by the movement of said breech block, said feed mechanism and said feed block being so mounted as to be quickly removable from the piece when desired, said feed mechanism comprising a feed lever constructed and arranged to vibrate laterally for moving the feed strip, and vertically to lock the breech block in the open position when the empty feed strip has been ejected, substantially as described.

29. In a gas operated gun, the combination with a gun barrel and a receiver, of a motor piston mounted to reciprocate in said receiver, said motor piston being provided with a vertically disposed ejector slot, and said receiver being also provided with an ejector slot, a sliding breech block also mounted in said receiver and operated by said motor piston, an extractor carried by said breech block, a feed block mounted in said receiver and adapted to receive a feed strip, an ejector carried by said feed block, opposite said ejector slot in the receiver, said ejector slots in the motor piston and in the receiver registering only when the motor piston reaches approximately the end of its rearward travel, and feed mechanism mounted above said feed block and operated by the movement of said breech block, said feed mechanism and said feed block being so mounted as to be quickly removable from the piece when desired, said feed mechanism comprising a feed lever constructed and arranged to vibrate laterally for moving the feed strip, and vertically to lock the breech block in the open position when the empty feed strip has been ejected, substantially as described.

30. In a gas operated gun, the combination with a gun barrel and a receiver, of a motor piston mounted to reciprocate in said receiver, said motor piston and said receiver being provided with an ejector slot, a sliding breech block also mounted in said receiver and operated by said motor piston, an extractor carried by said breech block, a feed block mounted in said receiver adapted to receive a feed strip, an ejector carried by said feed block, opposite said ejector slot in the receiver, a lid and feed mechanism contained therein mounted above said feed block, said feed mechanism comprising a feed lever constructed and arranged to vibrate laterally for moving the feed strip, and vertically to lock the breech block in the open position when the empty feed strip has been ejected, said feed mechanism being also operated by the movement of said breech block, substantially as described.

31. In a gas operated gun, the combination with a gun barrel and a receiver, of a motor piston mounted to reciprocate in said receiver, said motor piston and said receiver being provided with an ejector slot, a sliding breech block also mounted in said receiver and operated by said motor piston, an extractor carried by said breech block, a feed block mounted in said receiver adapted to receive a feed strip, an ejector carried by said feed block, opposite said ejector slot in the receiver, a lid and feed mechanism contained therein mounted above said feed block, said feed mechanism comprising a feed lever constructed and arranged to vibrate laterally for moving the feed strip, and vertically to lock the breech block in the open position when the empty feed strip has been ejected, said feed mechanism being also operated by the movement of said breech block, said lid and said feed block being so mounted as to be quickly removable from the piece when desired, substantially as described.

32. In a gas operated gun, the combination with a gun barrel and a receiver, of a motor piston mounted to reciprocate in said receiver, said motor piston and said receiver being provided with an ejector slot, a sliding breech block also mounted in said receiver and operated by said motor piston, a firing pin slidably mounted in said breech block, and connected to said motor piston, and constructed and arranged to strike the cartridge primer at the forward end of the stroke of said piston, an extractor carried by said breech block, a feed block mounted in said receiver adapted to receive a feed strip, an ejector carried by said feed block, opposite said ejector slot in the receiver, a lid and feed mechanism contained therein mounted above said feed block, said feed mechanism comprising a feed lever constructed and arranged to vibrate laterally for moving the feed strip, and vertically to lock the breech block in the open position when the empty feed strip has been ejected, said feed mechanism being also operated by the movement of said breech block, substantially as described.

33. In a gas operated gun, the combination with a gun barrel and a receiver, of a motor piston mounted to reciprocate in said receiver, said motor piston and said receiver being provided with an ejector slot, a sliding breech block also mounted in said receiver and operated by said motor piston, a firing pin slidably mounted in said breech block, and connected to said motor piston, and constructed and arranged to strike the cartridge primer at the forward end of the stroke of said piston, an extractor carried by said breech block, a feed block mounted in said receiver adapted to receive a feed strip, an ejector carried by said feed block, opposite said ejector slot in the receiver, a lid and feed mechanism contained therein mounted above said feed block, said feed mechanism comprising a feed lever constructed and arranged to vibrate laterally for moving the feed strip, and vertically to lock the breech block in the open position when the empty feed strip has been ejected, said feed mechanism being also operated by the movement of said breech block, said lid and said feed block being so mounted as to be quickly removable from the piece when desired, substantially as described.

34. In a gas operated gun, the combination with a gun barrel and a receiver, provided with abutments therein, of a motor piston mounted to reciprocate in said receiver, a sliding breech block also mounted in said receiver, a fermeture dog hinged to said breech block and adapted to engage said abutments, and a link pivoted respectively to said dog and said motor piston, and adapted to partially release said fermeture dog when the motor piston begins its rearward travel, a feed block mounted in said receiver, a firing pin slidably mounted in said breech block, and connected to said motor piston, and constructed and arranged to strike the cartridge primer at the forward end of the stroke of said piston, and feed mechanism mounted above said feed block and operated by the movement of said breech block, substantially as described.

35. In a gas operated gun, the combination with a gun barrel and a receiver, provided with abutments therein, of a motor piston mounted to reciprocate in said receiver, a sliding breech block also mounted in said receiver, a fermeture dog hinged to said breech block and adapted to engage said abutments, and a link pivoted respectively to said dog and said motor piston, and adapted to partially release said fermeture dog when the motor piston begins its rearward travel, a feed block mounted in said receiver, a firing pin slidably mounted in said breech block, and connected to said motor piston, and constructed and arranged to strike the cartridge primer at the forward end of the stroke of said piston, and feed mechanism mounted above said feed block and operated by the movement of said breech block, said feed mechanism and said feed block being so mounted as to be quickly removable from the piece when desired, substantially as described.

36. In a gas operated gun, the combination with a gun barrel and a receiver, provided with abutments therein, of a motor piston mounted to reciprocate in said receiver, a sliding breech block also mounted in said receiver, a fermeture dog hinged to said breech block and adapted to engage said abutments, a cam formed on the motor piston adapted to raise said fermeture dog into engagement with said abutments, and a link pivoted respectively to said dog and said motor piston, and adapted to partially release said fermeture dog when the motor piston resumes its rearward travel, a firing pin slidably mounted in said breech block, and connected to said motor piston, and constructed and arranged to strike the cartridge primer at the forward end of the stroke of said piston, a feed block mounted in said receiver, a lid and feed mechanism contained therein, mounted above said feed block, said feed mechanism being also operated by the movement of said breech block, said lid and said feed block being so mounted as to be quickly removable from the piece when desired, substantially as described.

37. In a gas operated gun, the combination with a gun barrel and a receiver, provided with abutments therein, of a motor piston mounted to reciprocate in said receiver, a sliding breech block also mounted in said receiver, a fermeture dog hinged to said breech block and adapted to engage said abutments, a cam formed on the motor piston adapted to raise said fermeture dog into engagement with said abutments, and a link pivoted respectively to said dog and said motor piston, and adapted to partially release said fermeture dog when the motor piston resumes its rearward travel, a feed block mounted in said receiver adapted to receive a feed strip, and feed mechanism mounted above said feed block and operated by the movement of said breech block, said feed mechanism comprising a feed lever constructed and arranged to vibrate laterally for moving the feed strip, and vertically to lock the breech block in the open position when the empty feed strip has been ejected, substantially as described.

38. In a gas operated gun, the combination with a gun barrel and a receiver, provided with abutments therein, of a motor piston mounted to reciprocate in said receiver, a sliding breech block also mounted in said receiver, a fermeture dog hinged to said breech block and adapted to engage said abutments, a cam formed on the motor piston adapted to raise said fermeture dog into engagement with said abutments, and a link pivoted respectively to said dog and said motor piston, and adapted to partially release said fermeture dog when the motor piston resumes its rearward travel, a feed block mounted in said receiver and adapted to receive a feed strip, feed mechanism mounted above said feed block and operated by the movement of said breech block, said feed mechanism and said breech block being so mounted as to be quickly removable from the piece when desired, said feed mechanism comprising a feed lever constructed and arranged to vibrate laterally for moving the feed strip, and vertically to lock the breech block in the open position when the empty feed strip has been ejected, substantially as described.

39. In a gas operated gun, the combination with a gun barrel and a receiver, provided with abutments therein, of a motor piston mounted to reciprocate in said receiver, a sliding breech block also mounted in said receiver, a fermeture dog hinged to said breech block and adapted to engage said abutments, a cam formed on the motor piston adapted to raise said fermeture dog into engagement with said abutments, and a link pivoted respectively to said dog and said motor piston, and adapted to partially release said breech block when the motor piston resumes its rearward travel, means controlled by said motor piston for locking said breech block in the forward and closed position, and for releasing same when the piece is fired, a feed block mounted in said receiver adapted to receive a feed strip, and feed mechanism mounted above said feed block and operated by the movement of said breech block, said feed mechanism comprising a feed lever constructed and arranged to vibrate laterally for moving the feed strip, and vertically to lock the breech block in the open position when the empty feed strip has been ejected, substantially as described.

40. In a gas operated gun, the combination with a gun barrel and a receiver, provided with abutments therein, of a motor piston mounted to reciprocate in said receiver, a sliding breech block also mounted in said receiver, a fermeture dog hinged to said breech block and adapted to engage said abutments, a cam formed on the motor piston adapted to raise said fermeture dog into engagement with said abutments, and a link pivoted respectively to said dog and said motor piston, and adapted to partially release said fermeture dog when the motor piston resumes its rearward travel, a feed block mounted in said receiver, and feed mechanism operated by the movement of said breech block, substantially as described.

41. In a gas operated gun, the combination with a gun barrel and a receiver, provided with abutments therein, of a motor piston mounted to reciprocate in said receiver, a sliding breech block also mounted in said receiver, a fermeture dog hinged to said breech block and adapted to engage said abutments, a cam formed on the motor piston adapted to raise said fermeture dog into engagement with said abutments, and a link pivoted respectively to said dog and said motor piston, and adapted to partially release said fermeture dog when the motor piston resumes its rearward travel, a feed block mounted in said receiver, and feed mechanism mounted above said feed block and operated by the movement of said breech block, substantially as described.

42. In a gas operated gun, the combination with a gun barrel and a receiver, provided with abutments therein, of a motor piston mounted to reciprocate in said receiver, a sliding breech block also mounted in said receiver, means controlled by said motor piston for locking said breech block in the forward and closed position, and for releasing same when the piece is fired, comprising a fermeture dog hinged to said breech block and adapted to engage said abutments, a cam formed on the motor piston adapted to raise said fermeture dog into engagement with said abutments, and a link pivoted respectively to said dog and said motor piston, and adapted partially to release said fermeture dog when the motor piston resumes its rearward travel, a feed block mounted in said receiver adapted to receive a feed strip, and feed mechanism mounted above said feed block and operated by the movement of said breech block, substantially as described.

43. In a gas operated gun, the combination with a gun barrel and a receiver, of a motor piston mounted to reciprocate in said receiver, breech closing mechanism, and feed mechanism controlled by said motor piston, a safety lever and mechanism controlled thereby for locking said motor piston near the rearward limit of its travel, and regulating mechanism for controlling the rate of fire, said regulating mechanism comprising a spring impressed lever normally projecting into the path of the motor piston, an escapement controlled by said lever, and a stop lever for the motor piston controlled by said escapement, said stop lever temporarily holding the motor piston in the cocked position, substantially as described.

44. In a gas operated gun, the combination with a gun barrel and a receiver, of a motor piston mounted to reciprocate in said receiver, breech closing mechanism, and feed mechanism controlled by said motor piston, and regulating mechanism for controlling the rate of fire, said regulating mechanism comprising a spring impressed lever normally projecting into the path of the motor piston, an escapement controlled by said lever, and a stop lever for the motor piston controlled by said escapement, said stop lever temporarily holding the motor piston in the cocked position, substantially as described.

45. In a gas operated gun, the combination with a gun barrel and a receiver, of a motor piston mounted to reciprocate in said receiver, breech closing mechanism, and feed mechanism controlled by said motor piston, a safety lever and mechanism controlled thereby for locking said motor piston near the rearward limit of its travel, and regulating mechanism for controlling the rate of fire, said regulating mechanism comprising a spring impressed lever normally projecting into the path of the motor piston, an escapement controlled by said lever, said escapement comprising a segmental gear, a pinion meshing with said gear, a whirl, a clutch adapted to lock said pinion and said whirl together when said spring impressed lever is released by the motor piston, and a stop lever for the motor piston controlled by said escapement, said stop lever temporarily holding the motor piston in the cocked position, substantially as described.

46. In a gas operated gun, the combination with a gun barrel and a receiver, of a motor piston mounted to reciprocate in said receiver, breech closing mechanism, and feed mechanism controlled by said motor piston, and regulating mechanism for controlling the rate of fire, said regulating mechanism comprising a spring impressed lever normally projecting into the path of the motor piston, an escapement controlled by said lever, said escapement comprising a segmental gear, a pinion meshing with said gear, a whirl, a clutch adapted to lock said pinion and said whirl together when said spring impressed lever is released by the motor piston, and a stop lever for the motor piston controlled by said escapement, said stop lever temporarily holding the motor piston in the cocked position, substantially as described.

47. In a gas operated gun, the combination with a gun barrel and a receiver, of a motor piston mounted to reciprocate in said receiver, breech closing mechanism, and feed mechanism controlled by said motor piston, a safety lever and mechanism controlled thereby for locking said motor piston near the rearward limit of its travel, and regulating mechanism for controlling the rate of fire, said regulating mechanism comprising a spring impressed lever engaged by said motor piston as said piston recoils, and an escapement set into operation by said lever, and temporarily arresting said piston as it begins the return movement, said escapement comprising a segmental gear, a pinion meshing with said gear, a whirl, and a clutch adapted to lock said pinion and said whirl together when said spring impressed lever is released by the motor piston, substantially as described.

48. In a gas operated gun, the combination with a gun barrel and a receiver, of a motor piston mounted to reciprocate in said receiver, breech closing mechanism, and feed mechanism controlled by said motor piston, and reguating mechanism for controlling the rate of fire, said regulating mechanism comprising a spring impressed lever engaged by said piston and an escapement set into operation by said lever as said piston recoils, and temporarily arresting said piston as it begins the return movement, said escapement comprising a segmental gear, a pinion meshing with said gear, a whirl, and a clutch adapted to lock said pinion and said whirl together when said spring impressed lever is released by the motor piston, substantially as described.

49. In a gas operated gun, the combination with a receiver of a barrel mounted at the front end of said receiver, and a stock mounted at the rear end thereof, a motor piston mounted to reciprocate in said receiver, a tube mounted in said stock in the line of travel of said motor piston, a return spring mounted in said tube, and a rod slidably mounted in said tube and interposed between said spring and said piston, with a spring stop normally projecting into said tube near its forward end and holding said spring in said tube when the stock is removed from the gun, substantially as described.

50. In a gas operated gun, the combination with a receiver of a barrel mounted at the front end of said receiver, and a stock mounted at the rear end thereof, a motor piston mounted to reciprocate in said receiver, a tube mounted in said stock in the line of travel of said motor piston, a return spring mounted in said tube, and a rod slidably mounted in said tube and engaging at its forward end the rear end of said piston, and a cap mounted on the rear end of said rod and engaging said return spring, with a spring stop normally projecting into said tube near its forward end and engaging said cap when the stock is removed from the piece, thereby holding said return spring in said stock, unless said stop be pressed out of engagement, substantially as described.

CHARLES SUTTER.